United States Patent [19]
Prasad

[11] Patent Number: 5,471,574
[45] Date of Patent: Nov. 28, 1995

[54] IMPROVED METHOD FOR DISPLAYING A COMPUTER GENERATED GRAPHIC ON A RASTER OUTPUT SCANNER

[75] Inventor: Bindiganavele A. Prasad, Los Altos, Calif.

[73] Assignee: Xerox Corporation, Stamford, Conn.

[21] Appl. No.: 297,746

[22] Filed: Aug. 29, 1994

Related U.S. Application Data

[63] Continuation-in-part of Ser. No. 136,226, Oct. 13, 1993, abandoned, which is a continuation-in-part of Ser. No. 537,951, Jun. 14, 1990, abandoned.

[51] Int. Cl.⁶ ............................................. G06T 11/00
[52] U.S. Cl. ........................ 395/142; 395/133; 395/141
[58] Field of Search ........................... 395/119, 120, 395/125, 127, 128–132, 133, 136, 141, 140, 142, 150, 151; 345/141–144

[56] References Cited

U.S. PATENT DOCUMENTS 4,829,456  5/1989  Joonishi et al. .................... 395/119

Primary Examiner—Almis R. Jankus
Attorney, Agent, or Firm—Robert Cunha

[57] ABSTRACT

A faster method of generating a mask stroke for a given trajectory. The first step is to determine if parallel lines can be developed for the entire trajectory. If not, the trajectory is divided into segments for each of which a set of parallel lines can be generated. The second step is to generate the parallel lines.

2 Claims, 18 Drawing Sheets

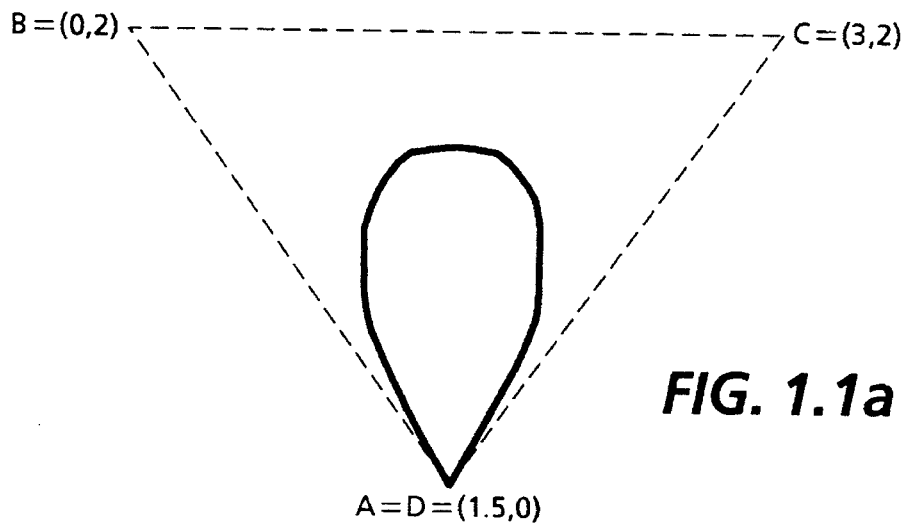
*FIG. 1.1a*
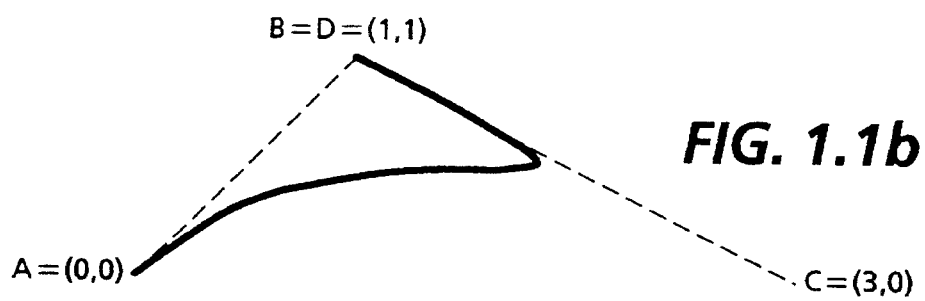
*FIG. 1.1b*
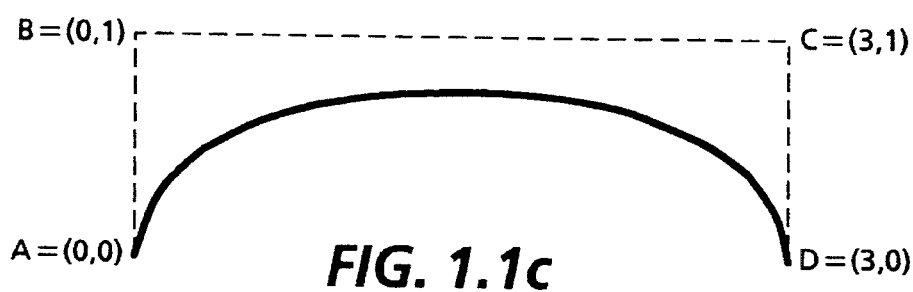
*FIG. 1.1c*
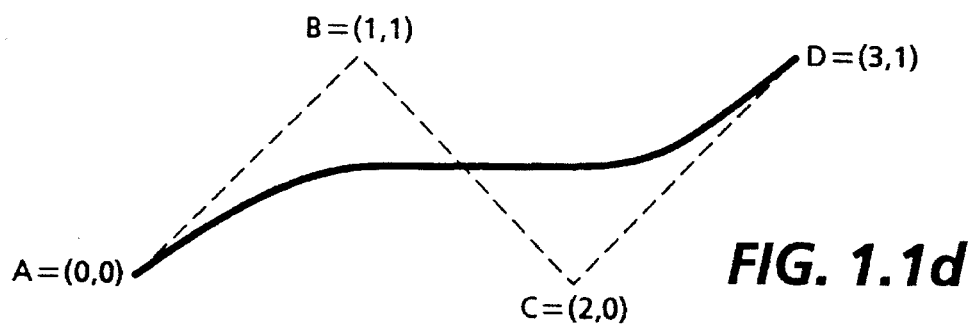
*FIG. 1.1d*

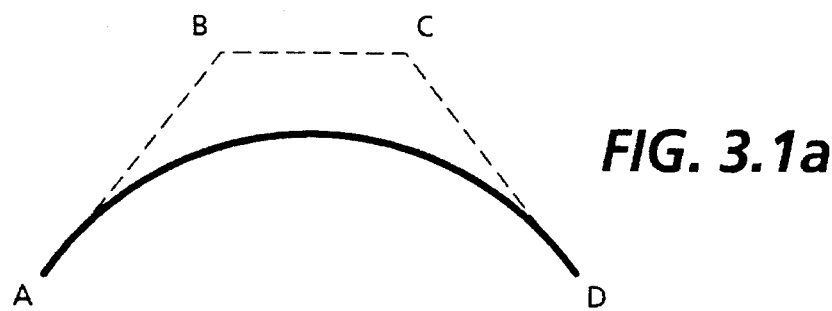
FIG. 3.1a
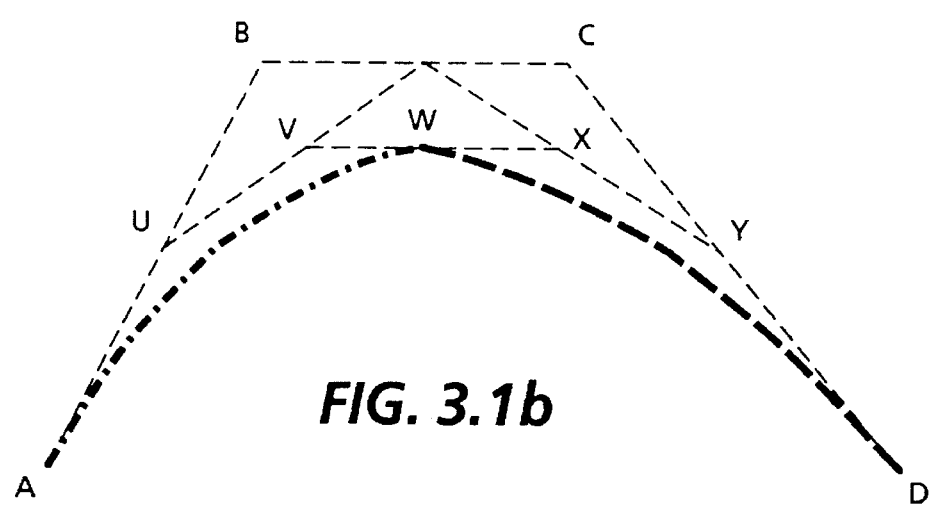
FIG. 3.1b
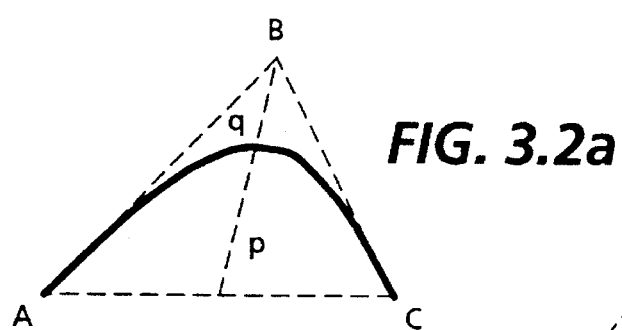
FIG. 3.2a
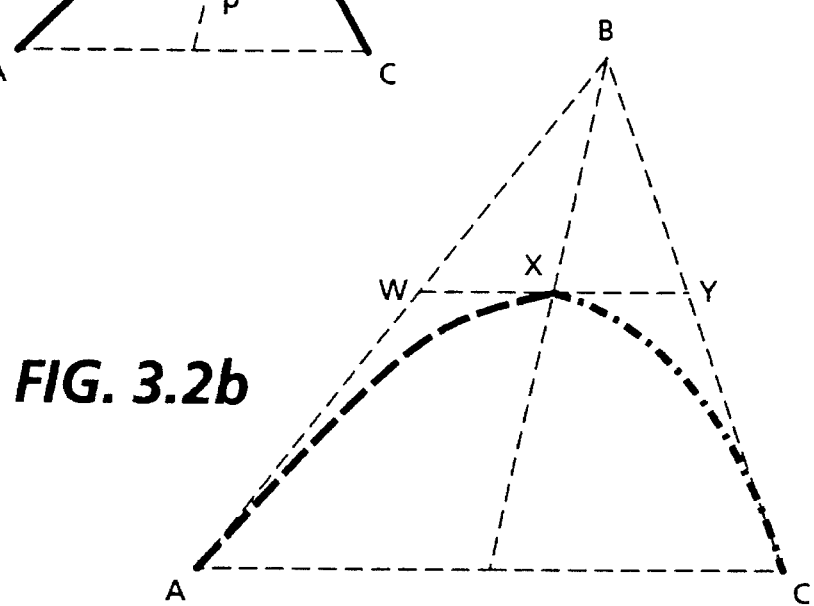
FIG. 3.2b

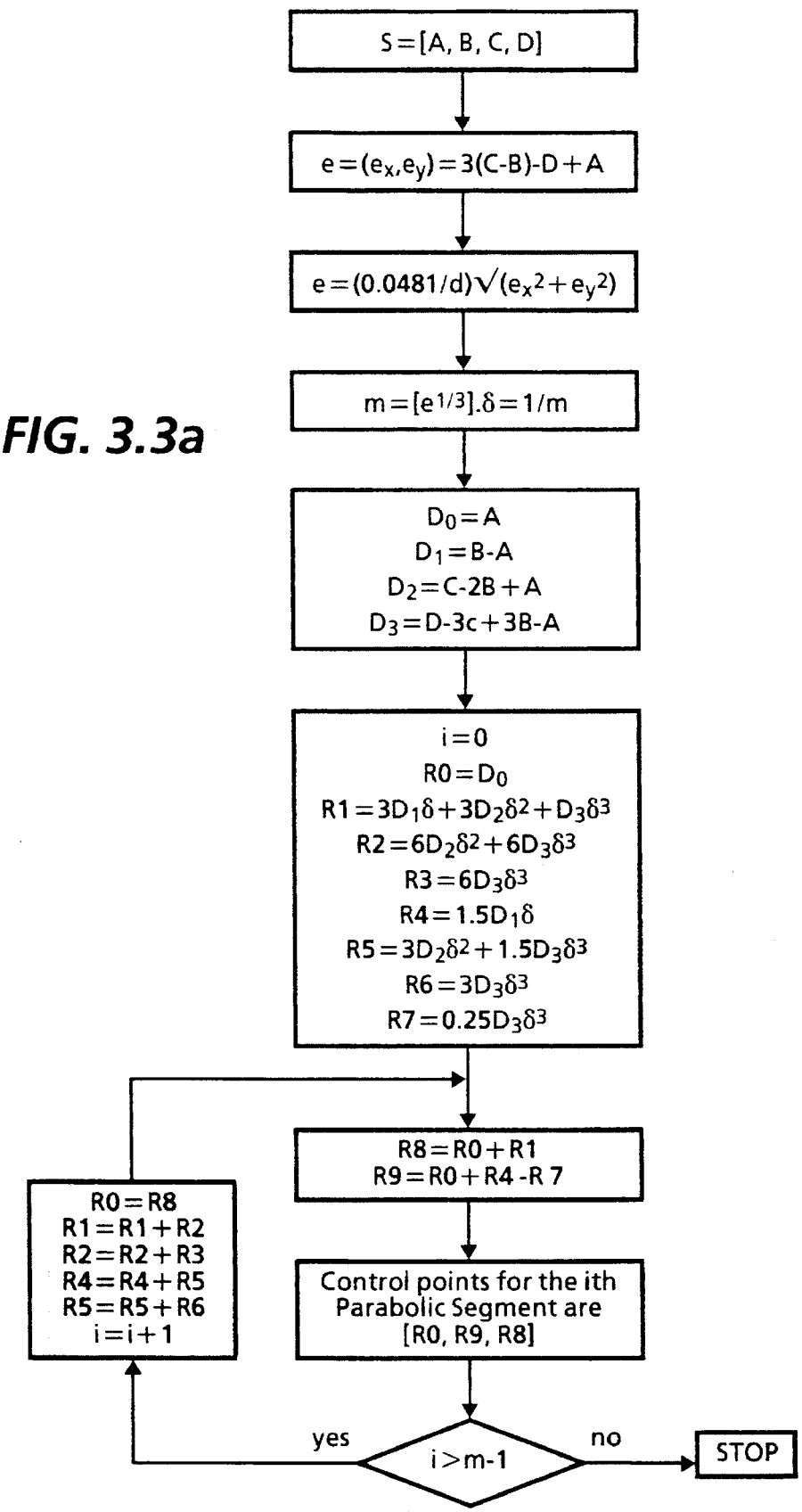
*FIG. 3.3a*

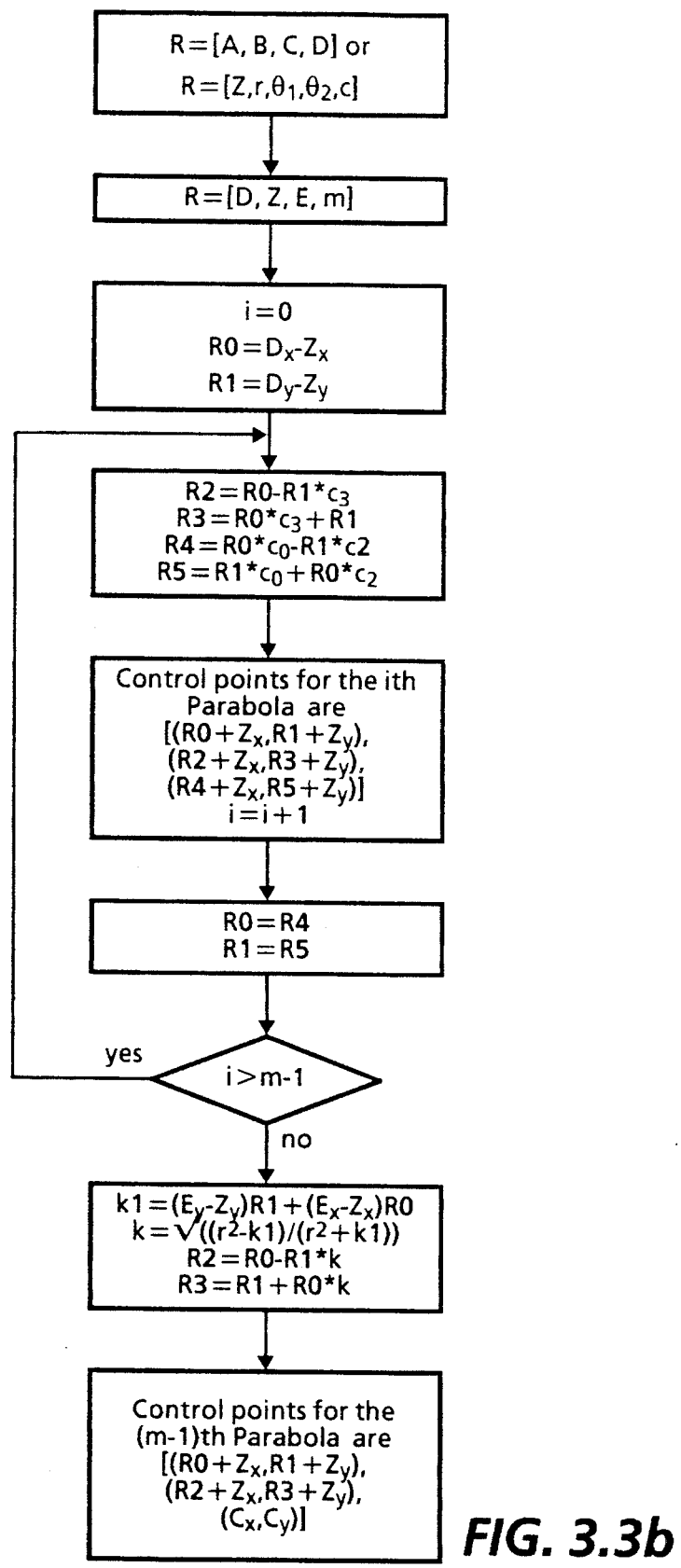
FIG. 3.3b

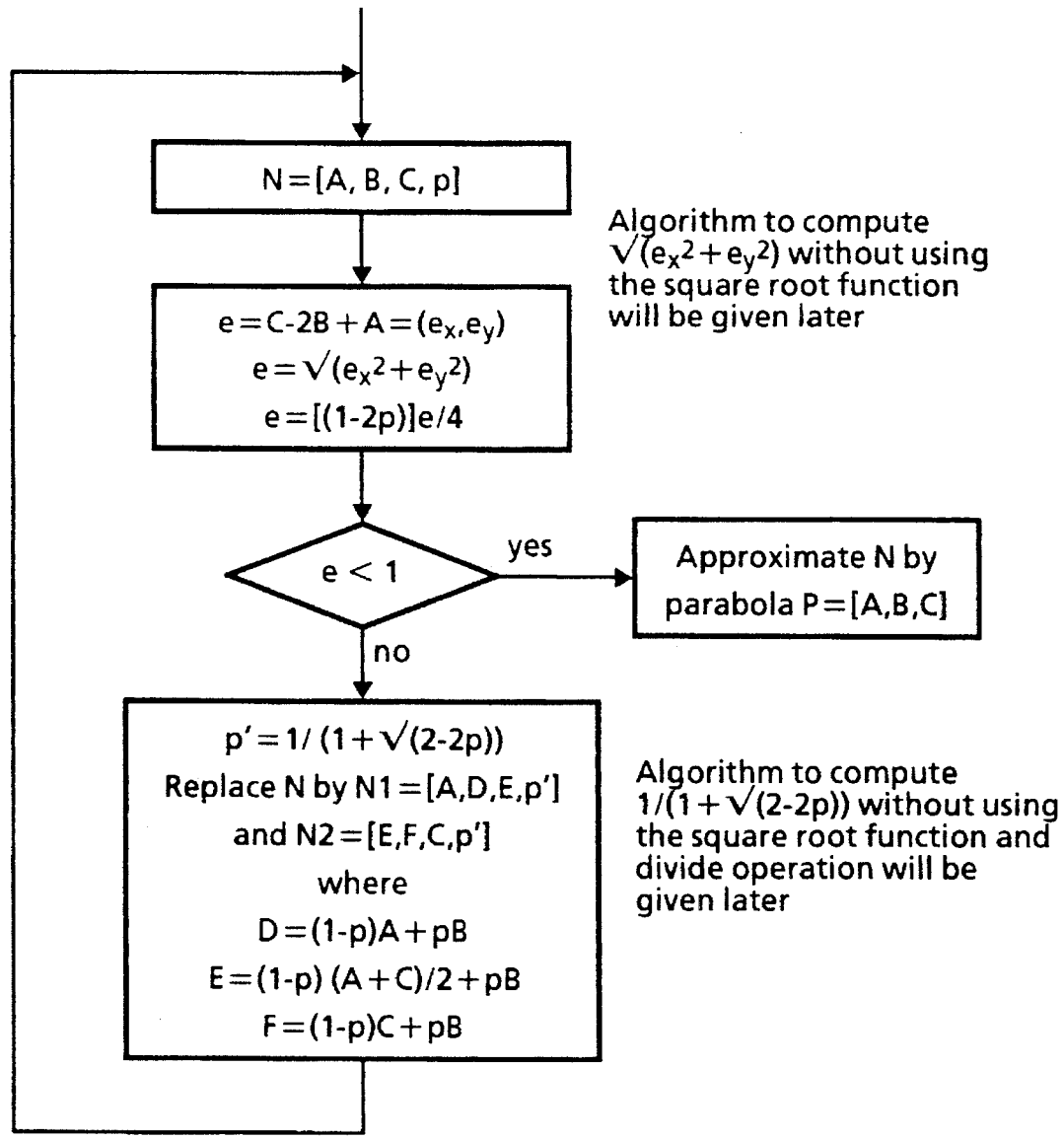
FIG. 3.3c

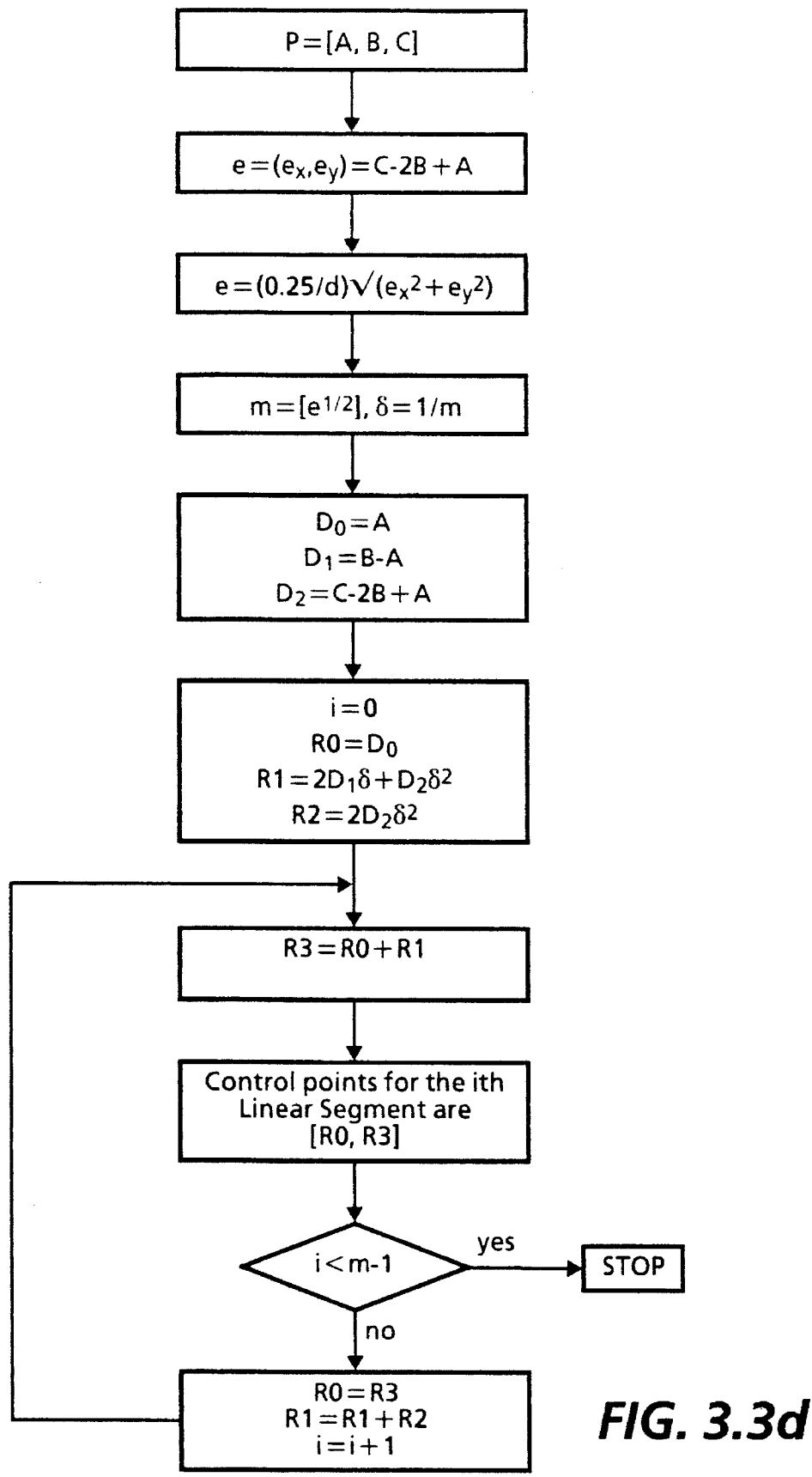
FIG. 3.3d

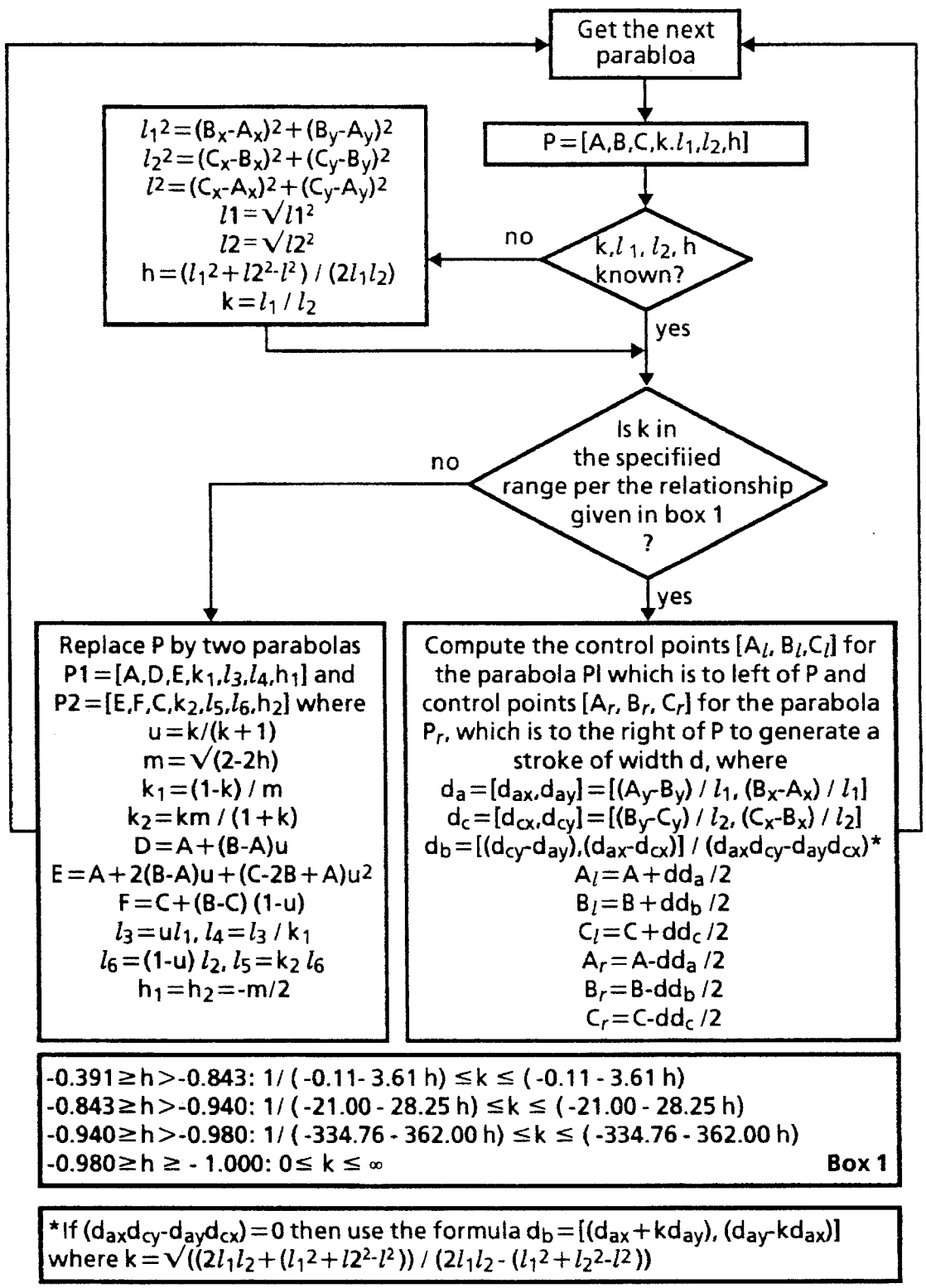
FIG. 3.3e

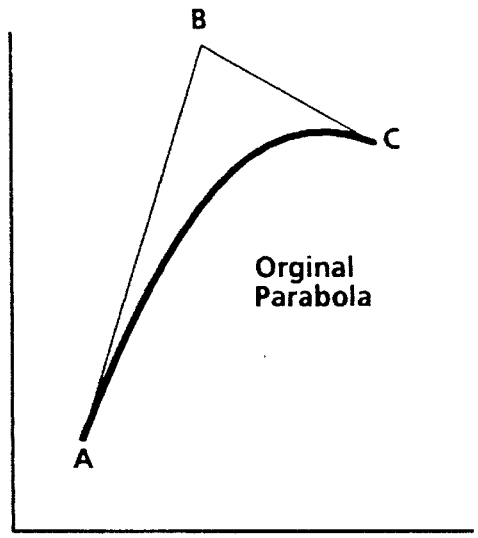
FIG. 5.1a
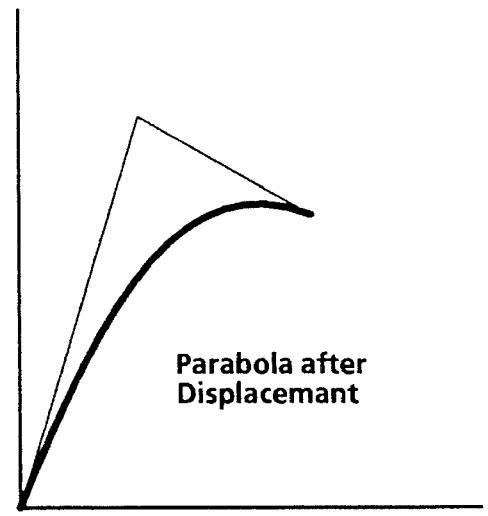
FIG. 5.1b
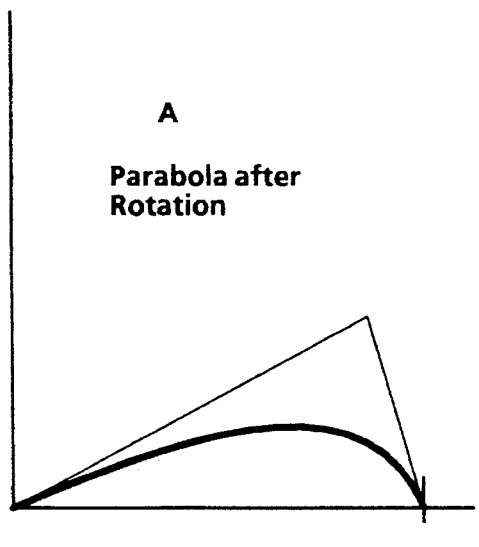
FIG. 5.1c
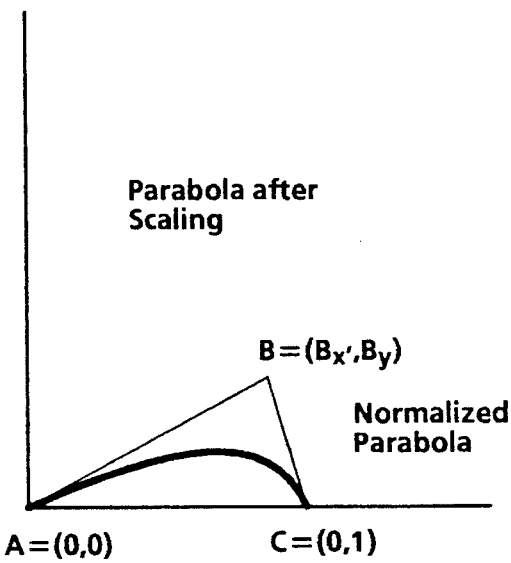
FIG. 5.1d

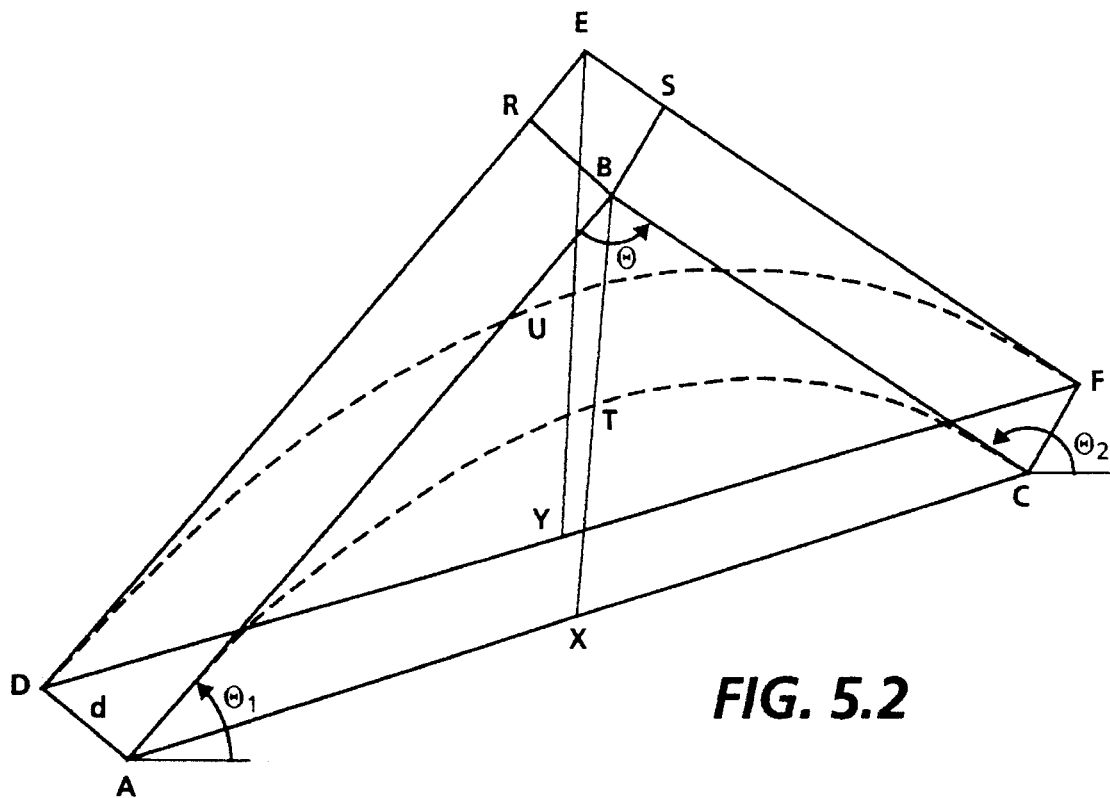
FIG. 5.2
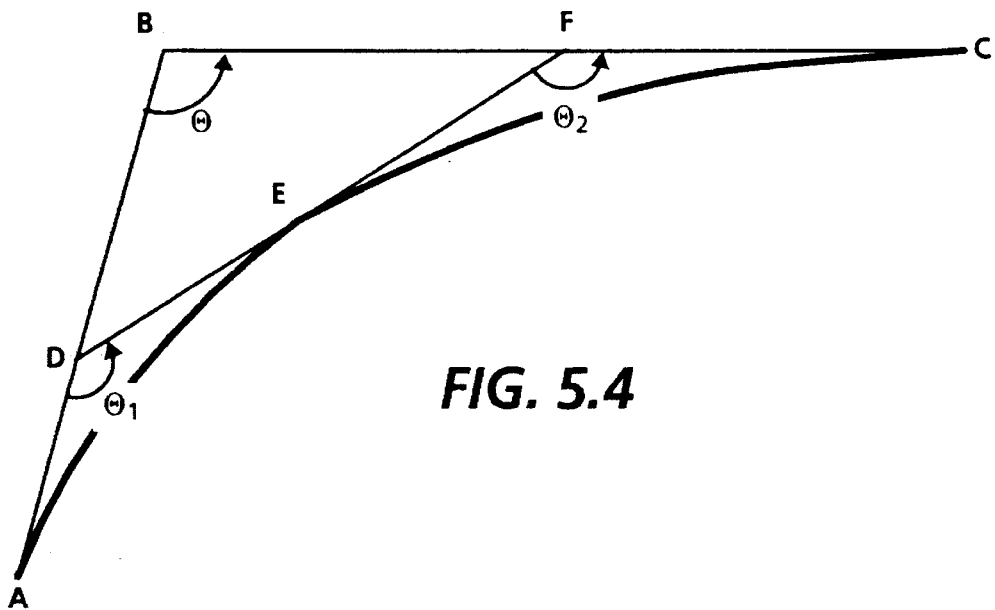
FIG. 5.4

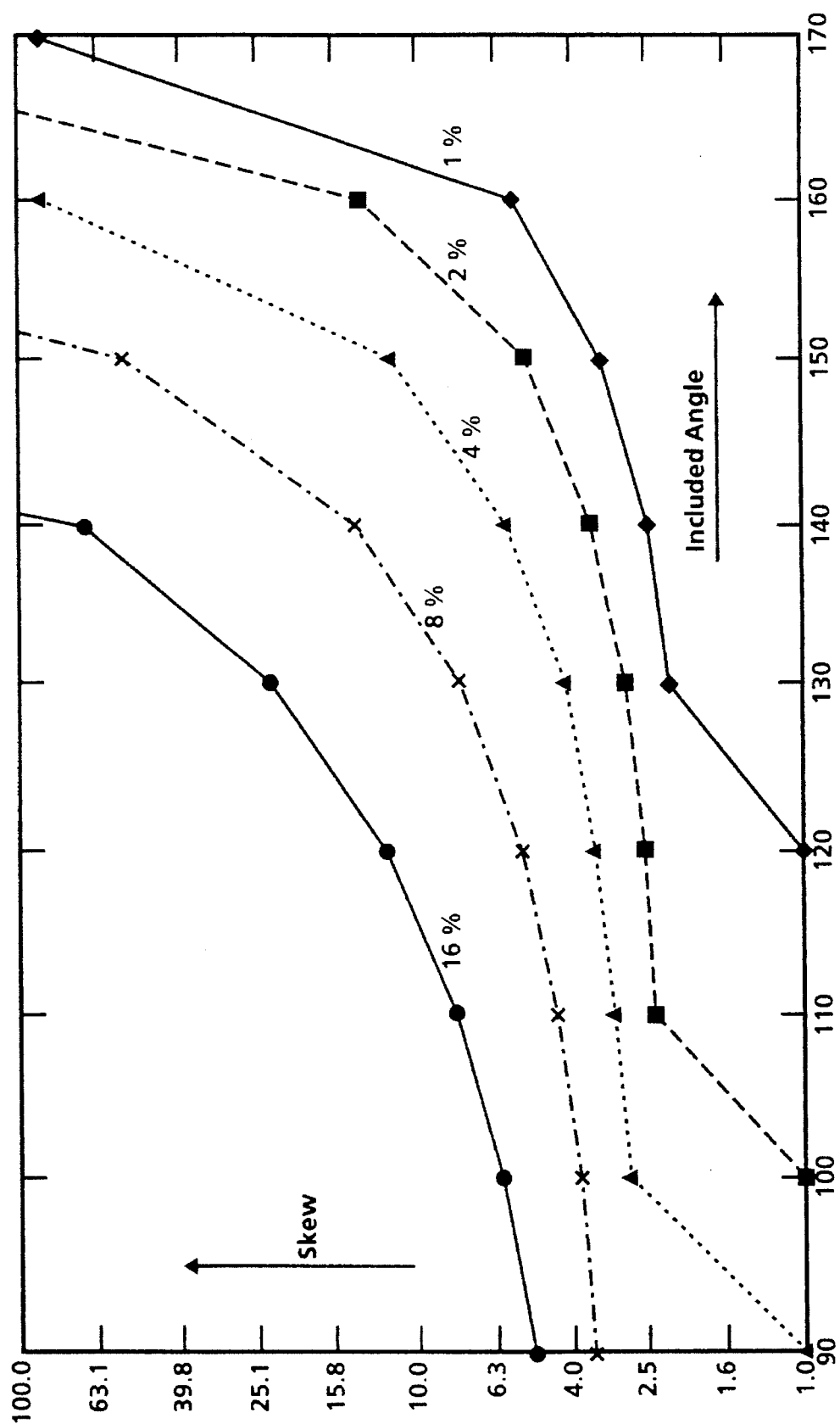
FIG. 5.3

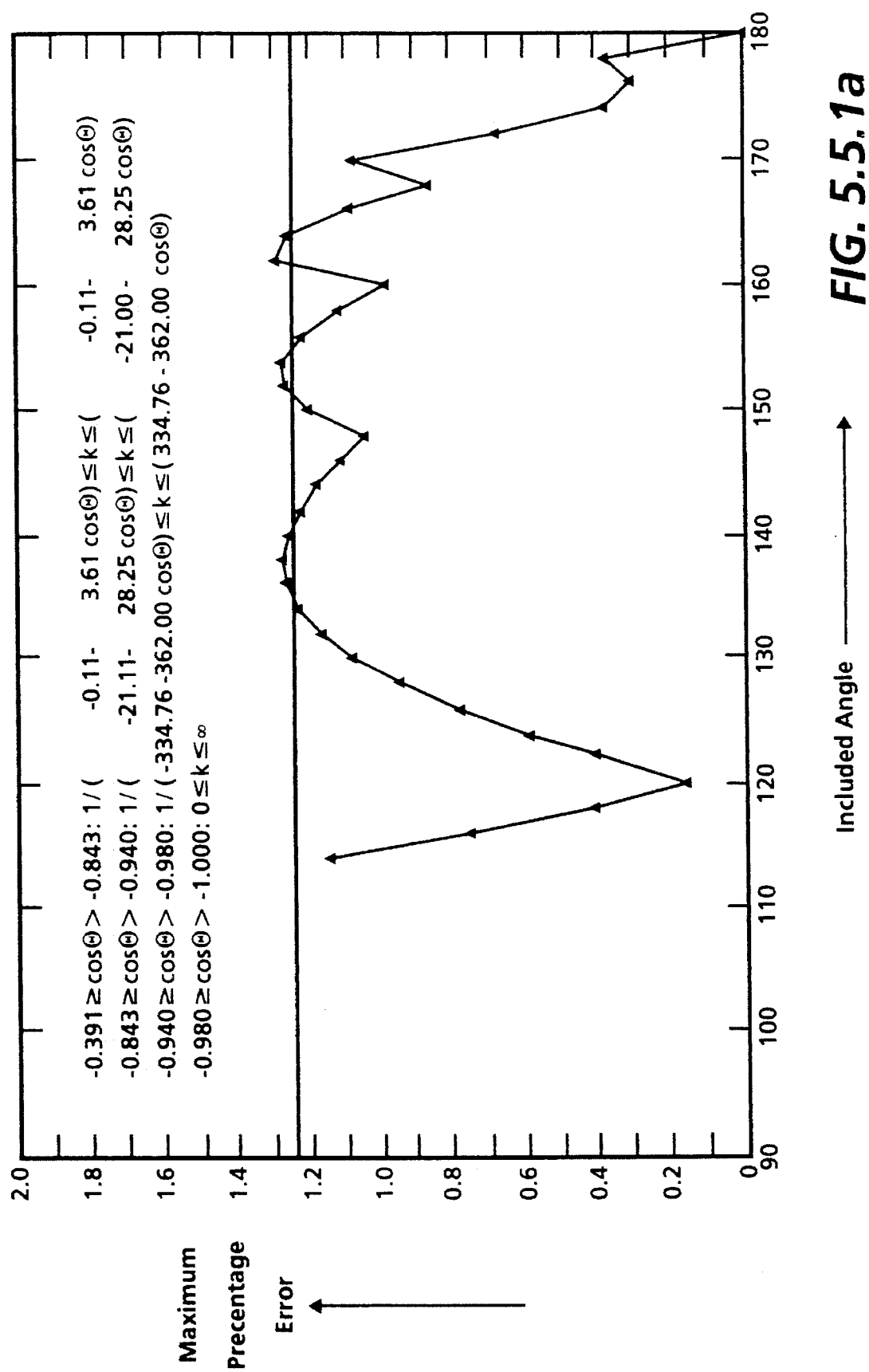
FIG. 5.5.1a

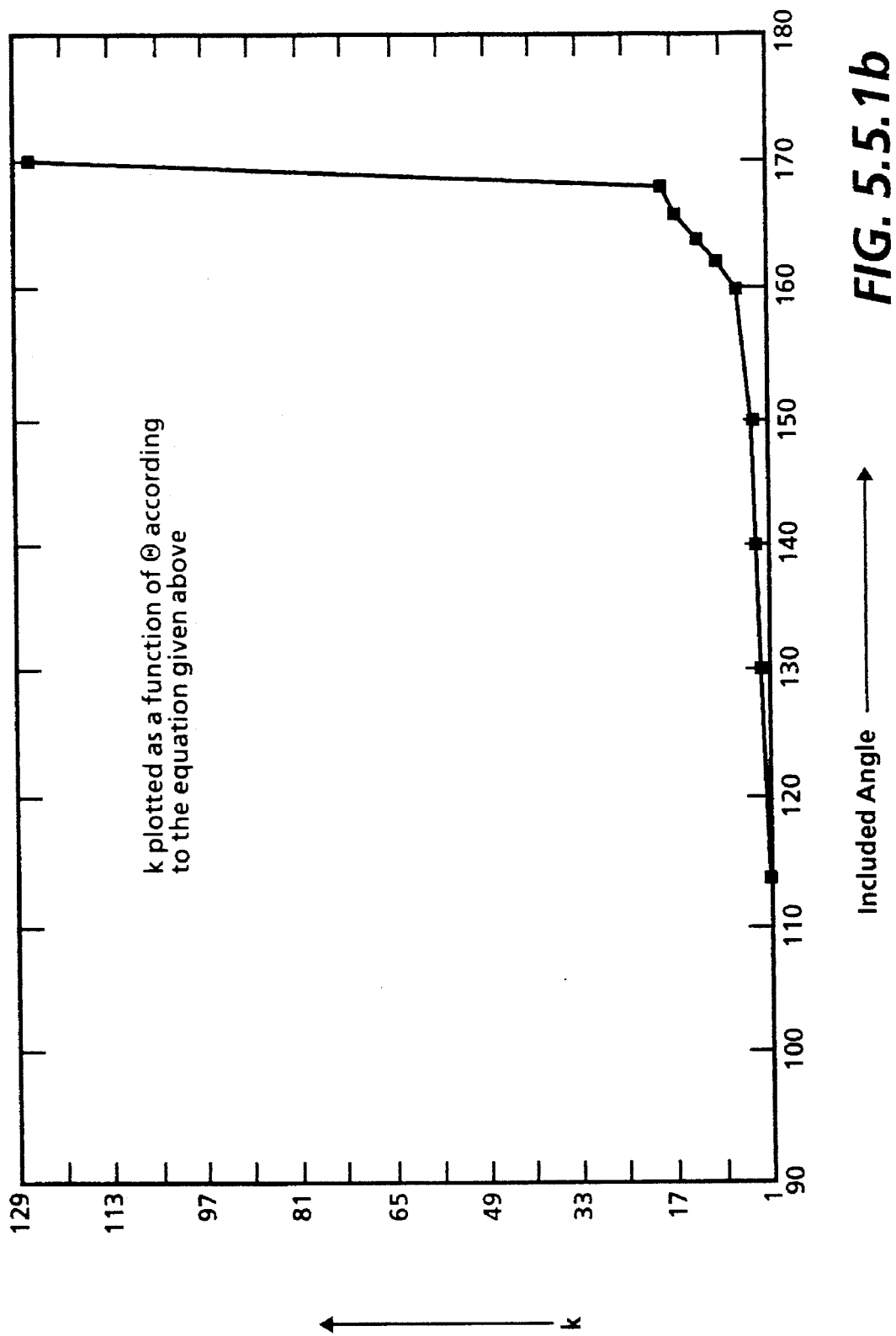
FIG. 5.5.1b

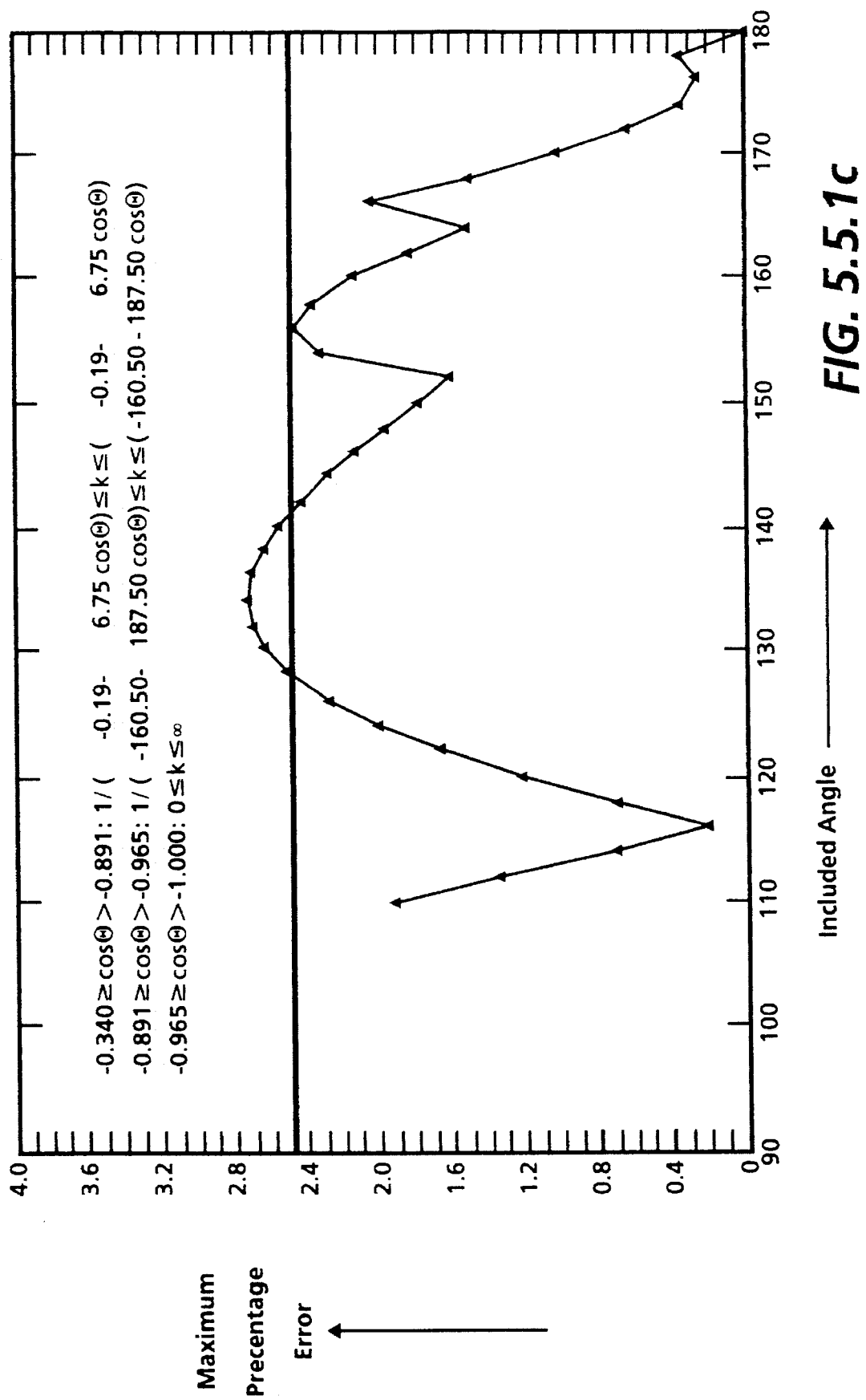
FIG. 5.5.1c

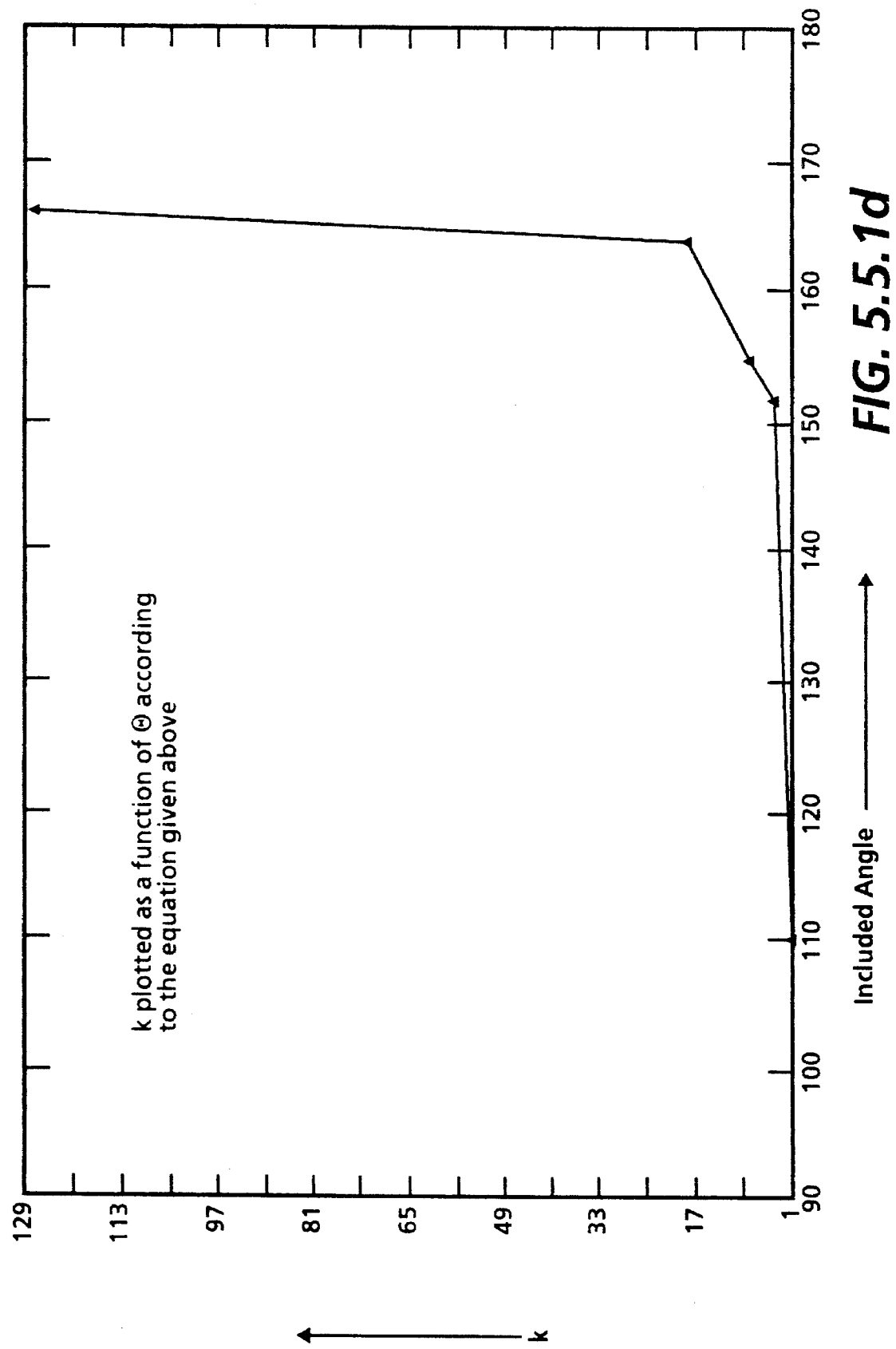
FIG. 5.5.1d

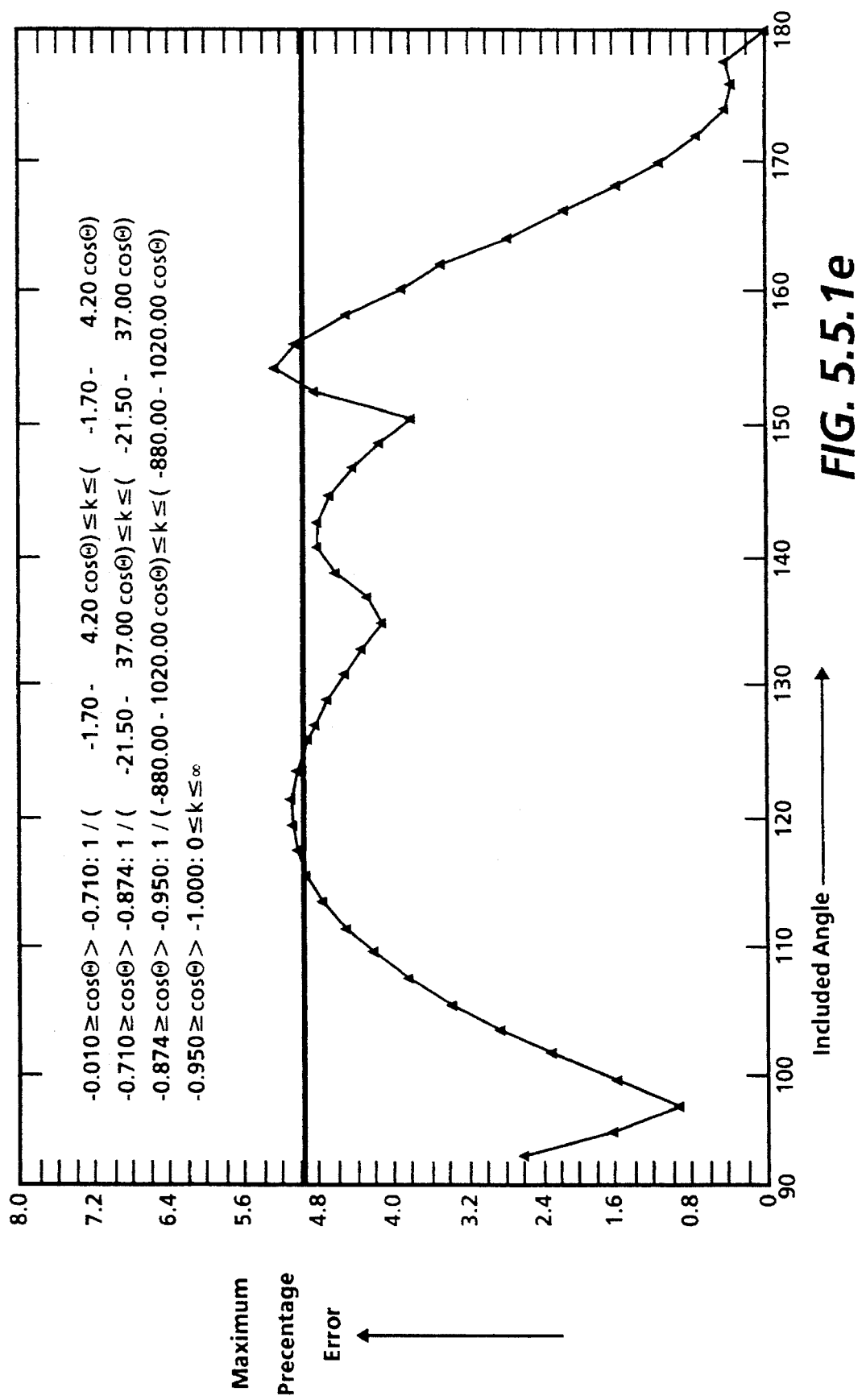
FIG. 5.5.1e

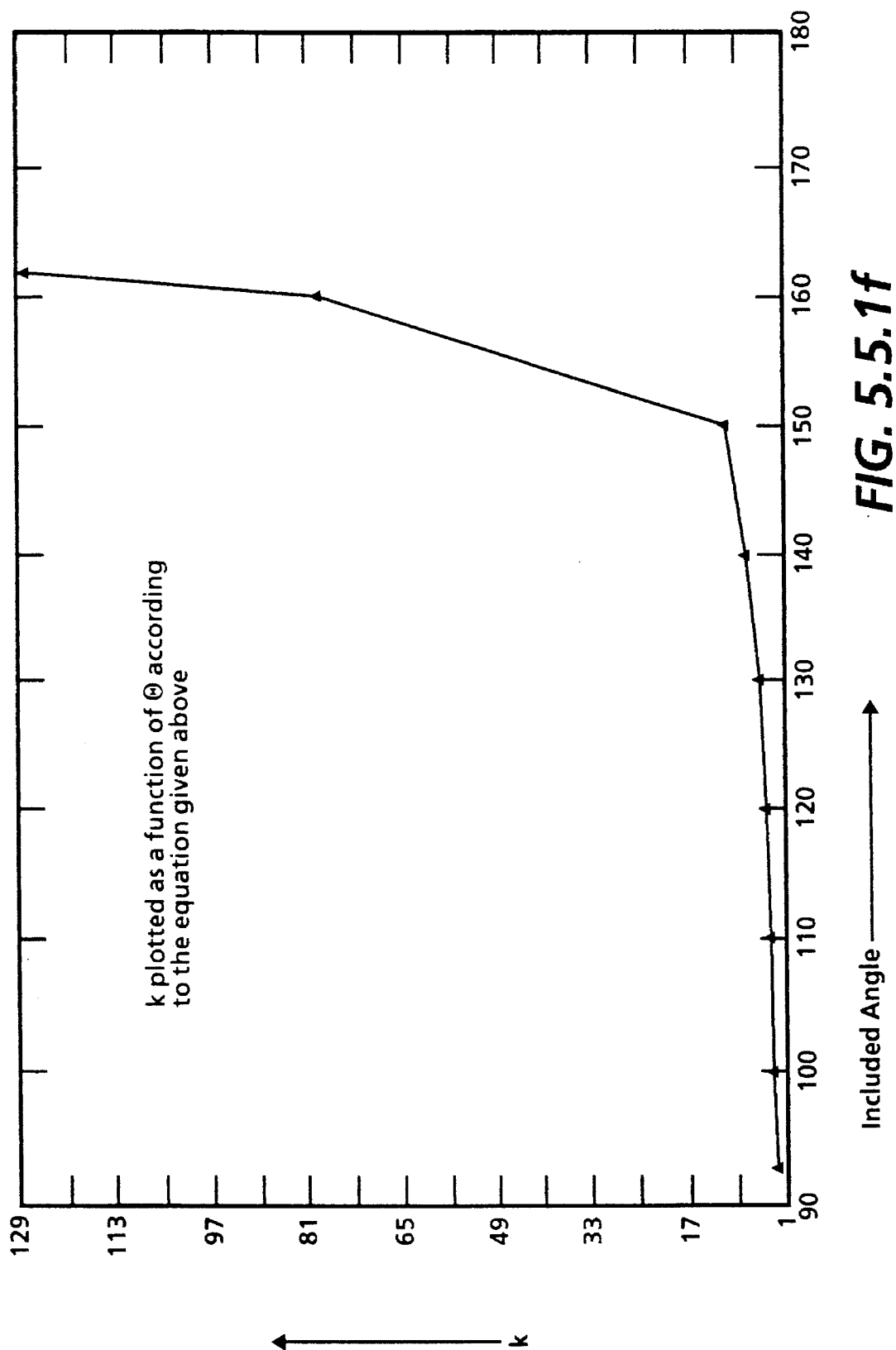
FIG. 5.5.1f

IMPROVED METHOD FOR DISPLAYING A COMPUTER GENERATED GRAPHIC ON A RASTER OUTPUT SCANNER

BACKGROUND OF THE INVENTION

This application is a continuation-in-part of application Ser. No. 08/136,226, filed Oct. 13, 1993, now abandoned which is a continuation-in-part of application Ser. No. 07/537,951, filed Jun. 14, 1990, now abandoned.

It is common in computer aided design and desk top publishing to enter data at a computer terminal in a page description language such as INTERPRESS or POST-SCRIPT. Text typically enters the computer in the form of character code, and curves, or trajectories, are entered in the form of control points, or the like. The computer reduces the original curves to a bit map, and a raster output scanner, printer or CRT display, will display the resultant visual curve. A problem is that the original curve has no width, so that two approximating curved lines, one on each side of the original curve and one line width apart, must be generated.

This invention is an algorithm for generating two lines on either side of, and equally distant from, an original trajectory, and more specifically comprises a first step for determining which segments of the original trajectory can be used to generate such parallel lines, and a second step for generating them.

In Interpress terms, a "mask stroke" is defined as giving a width to an open trajectory by supplying two equally distant lines parallel to the original trajectory, resulting in what is referred to herein as "parazoids", that is, trapezoids whose two parallel sides are curved, and filling in the area. The original trajectory segments could be cubic splines, parabolas, conics, arcs and lines.

The conventional approaches are either to decompose the trajectory into line segments and then compute the coordinates of a trapezoid corresponding to each line segment, or to trace an eliptical pen along a parabola to generate the offset parabolas. This parazoid can then be filled to generate the masked stroke. A more direct and rapid method is required.

SUMMARY OF THE INVENTION

The method comprises a first step to determine if a parazoid will adequately approximate the masked stroke. If not, the alogrithm subdivides the trajectory recursively until each of the segments satisfies the test. The second step is an algorithm to compute directly a parazoid corresponding to each segment.

BRIEF DESCRIPTION OF THE DRAWINGS

FIGS. 1.1a through 1.1d and 2a through 2c are the curves used for the example analysis in Section 1.

FIG. 3.1a and 3.1b are an aid in the understanding of a cubic spline.

FIG. 3.2b and 3.2b are an aid in the understanding of a conic.

FIGS. 3.3a through 3.3e are flowcharts of the algorithm to approximate a cubic spline by parabolic segments.

FIGS. 5.1a through 5.1d show the steps involved in transforming an arbitrary parabola to a normalized parabola.

FIG. 5.2 is an example of a parabola.

FIG. 5.3 shows maximum skew as a function of included angle.

FIG. 5.4 is the parabola defined in Section 5.4.

FIGS. 5.5.1a through 5.5.1f illustrate the relationship between skew and included angle.

DETAILED DESCRIPTION OF THE INVENTION

1.0 Summary

The system must have a computer, a keyboard for entering data and a raster output scanner, which can be a CRT user interface or a printer. One such system is described in U.S. Pat. No. 4,829,456, Three-Dimensional Surface Display Method, which is incorporated by reference herein. FIG. 1 of this patent is a block diagram showing a graphic display system including a keyboard 1 for inputting data, a graphic display unit 3, a graphic controller 4 for controlling the keyboard 1, and a computer 5. Described in this patent is a method of calculating curves from input data, normally in the form of page description language (PDL) and displaying the result on a raster output scanner in the form of said graphic display terminal.

This patent considers two computationally intensive problems associated with graphics in PDL decomposition and imaging.

The first problem considered is the generation of a trajectory whose segments could be cubic splines, parabolas, conics, circular arcs and lines. The prevalent approach is to decompose the complex curves into line segments and then generate the line segments using a combination of general purpose computing elements and hardware accelerators. The decomposition of curves into line segments are generally done through a recursive sub division and test process until the approximation error is within the acceptable error limit. In this paper we give algorithms which decompose higher order curves into parabolic segments where the number of parabolic segments needed to approximate a curve to any desired level of accuracy can be determined a priori. This property is then used to set up simple stepper algorithms in software which directly generate the control points for the parabolic segments. The parabolic trajectory can then be generated by a stepper hardware similar to that described by Marshall in Reference 1. In case a strictly software approach is desired, we have also included algorithms here to decompose the parabolas generated by the earlier process into line segments by an even simpler stepper algorithm.

Figure 2A:
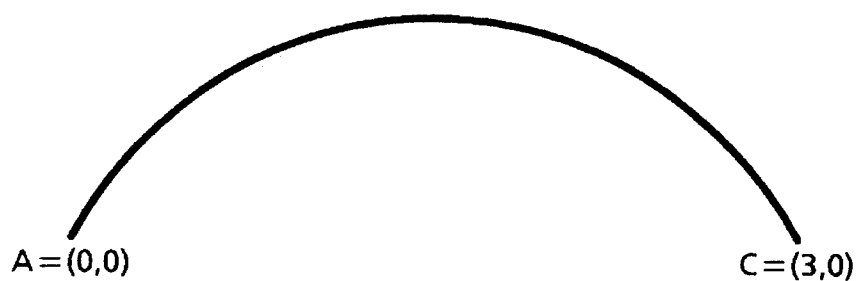
Figure 2B:
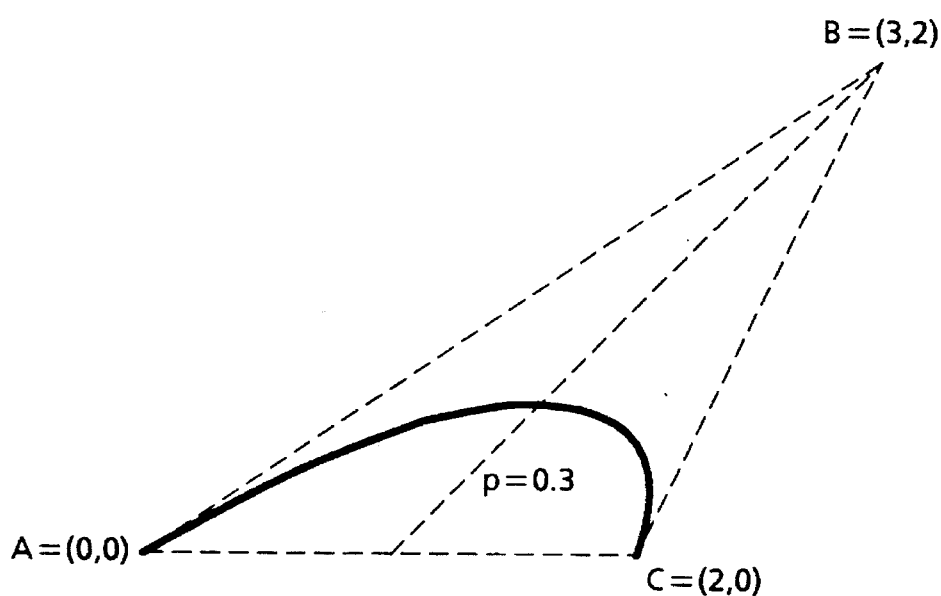
Figure 2C:
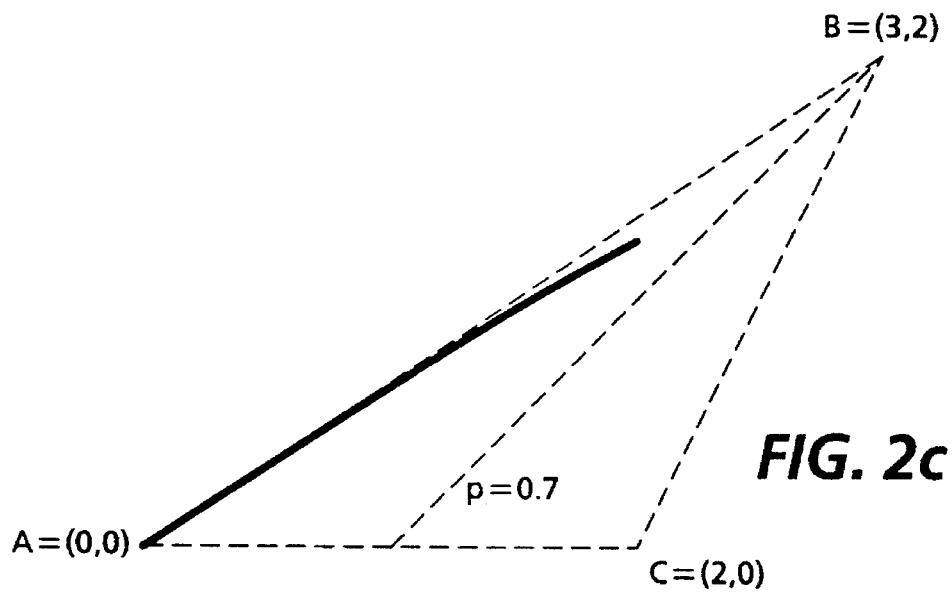

Table 1.1 shows the advantage of decomposing curves into parabolic segments instead of line segments. For the examples considered the number of segments needed to approximate the curve can be reduced by factors of 3 to 9, if parabolic segments are used instead of linear segments. The different curves used for the example analysis along with their control points are shown in FIGS. 1.1 and 1.2. FIG. 1a–d are cubic splines, FIG. 2a is a circular arc and FIGS. 2b and c are conic sections. It is assumed that at most a single pixel error can be tolerated between the exact curve and its approximation.

The second problem considered is the generation of a masked stroke with a center line trajectory whose segments could be cubic splines, parabolas, conics, circular arcs and lines. Here again the prevalent approach is to decompose the trajectory into line segments and then compute the coordinates of a trapezoid corresponding to each line segment. In this paper we give an algorithm to compute directly a "parazoid" corresponding to a given parabola. This parazoid can then be filled to generate the masked stroke. A "parazoid" is a four sided figure in which the "parallel" sides are parabolas and the other two sides are lines. We also give a simple test which has to be satisfied in order that the parazoid adequately approximates the masked stroke. If a parabola does not satisfy the given test, then another algorithm is given which optimally subdivides the parabola recursively until each of the components satisfy the test. Of particular interest is the fact that the earlier algorithm given to approximate circular arcs by parabolas generates parabolic segments which always satisfy the test.

The following table shows the advantage of decomposing a masked stroke into parazoids instead of trapezoids. Again for the examples considered, the number of parazoids needed to approximate a masked stroke can be between 1/3 to 1/9 of the number of trapezoids needed to approximate the same masked stroke. The different curves used for the example analysis along with their control points are shown in FIGS. 1.1 and 1.2. It is assumed that at most a single pixel error can be tolerated between the exact stroke and its approximation.

TABLE 1.2

| Curve Type | 300 spi | | 600 spi | |
|---|---|---|---|---|
| | number of parazoids | number of trapezoids | number of parazoids | number of trapezoids |
| Cubic Spline 1 | 6 | 32 | 7 | 56 |
| Cubic Spline 2 | 8 | 32 | 10 | 44 |
| Cubic Spline 3 | 5 | 32 | 6 | 40 |
| Cubic Spline 4 | 4 | 17 | 5 | 25 |
| Circular Arc | 6 | 18 | 6 | 25 |
| Conic 1 | 4 | 24 | 4 | 32 |
| Conic 2 | 9 | 36 | 9 | 52 |

A natural extension of the approach used in this paper would be to use cubic spline segments and "cubezoids" instead of parabolic segments and parazoids and further reduce the number of segments needed to approximate any given curve. However a theory similar to the one developed here needed to validate those algorithms becomes very complicated and almost intractable. Also, arbitrary cubic splines can have self intersections causing more complications. One may have to sub divide a cubic spline anyway to eliminate self intersections and also to improve the efficiency of the stepper before start of the stepping process. Parabolas on the other hand are very well behaved curves. Very efficient and simple adaptive stepping algorithms can be implemented in hardware for a parabola, if hardware support is desired. It is claimed here that decomposing all curves into parabolic segments is an optimum approach when both simplicity and efficiency is considered. A theory and a set of algorithms with such an approach in mind is developed in this paper.

2.0 Introduction

Page Description Languages (PDL's) such as Interpress and Postscript support fairly powerful graphical primitives allowing the generation of filled areas whose outlines are defined by cubic splines, conics, parabolas, circular arcs and straight lines. Also they support strokes of specified widths whose center lines can be cubic splines, conics, parabolas, circular arcs and straight lines. In this paper mathematical results and some algorithms are given that the author hopes will enable the rapid generation of these outlines. Much of the paper deals with criteria for approximating higher order / difficult primitives by a sequence of lower order / simpler primitives. Some of the mathematical results may be of interest in their own right.

In section 3 the properties of cubic splines, parabolas, conic sections, circular arcs and straight lines are reviewed. In particular, parametric equations for each of these curves and the rules for the subdivision of these curves are given. Also a concise description of the algorithms are given in a flow chart form. The flow charts are given so that the essence of the algorithms are stated without complicating the flow charts. Several additional optimizations can be done at the time of coding these algorithms. No attempt has been made here to explicitly state all those optimizations.

In section 4 the mathematical theory for approximating a given curve by a sequence of "simpler curves" to any desired level of accuracy is given. A curve is considered "simple" if known methods exist for rapid generation of these curves through simple algorithms and/or hardware.

Section 4 is restricted to the problem of generating outlines. While this is an important part of PDL decomposition, there is also a need for generation of strokes of a specified width whose center line can be any one of the curves mentioned earlier. Generally the strokes are obtained by stepping a filled elliptical pen along the center line. Liu has used the technique of stepping an elliptical pen to generate the outline of the stroke and then fill the enclosed region through a filling algorithm. In section 5, we develop a theory leading to the algorithm given in section 3. This algorithm can be used to generate the outline of the stroke directly as a sequence of synthetic curves without the need for stepping an elliptical pen along the center line.

3.0 Definitions, Properties and Algorithms

In this section we give the parametric equations for cubic splines, conics, parabolas, circles and straight lines. We also state some of the important properties about these curves. We then give algorithms to efficiently decompose higher order curves into parabolas, parabolas into lines and masked strokes into parazoids.

3.1 Cubic Splines

A cubic spline with control points [A,B,C,D] can be described by the following parametric equation, $$[X(t),Y(t)]=A(1-t)^3+ 3Bt(1-t)^2+ 3Ct^2(1-t)+Dt^3$$

where $0<t<1$ and $A=[A_x,A_y], B=[B_x,B_y], C=[C_x,C_y], D=[D_x, D_y]$ which can also be written as $$[X(t),Y(t)]=D_0+3D_1t+3D_2t^2+ D_3t^3 \text{ where } 0<t<1$$

and $D_0=A, D_1=B-A, D_2=C-2B+A, D_3=D-3C+3B-A$

FIG. 3.1 helps in understanding the definition and properties of a cubic spline. A cubic spline is shown defined by control points A, B, C, D. In FIG. 3.1a the curve is tangential to AB at A and CD at D. In FIG. 3.1b the cubic spline A, B, C, D subdivides into two cubic splines A, U, V, W and W, X, Y, D.

A cubic spline [A,B,C,D] has the property that any segment of it is also a cubic spline. In particular it can be subdivided into two cubic splines whose control points are given by the following expressions.

$$[A,(A+B)/2,(A+2B+C)/4,(A+3B+3C+D)/8]$$

$$[(A+3B+3C+D)/8,(B+2C+D)/4,(C+D)/2,D\ ]$$

3.2 Conics

A conic with control points [A,B,C] and a shape parameter "$\rho$", where $0 \leq \rho \leq 1$ can be described by the following parametric equation.

$$(q+\rho \cos t)[X(t),Y(t)]=[(A+C)/2]q-[(A-C)/2]q \sin t + \rho B \cos t$$

where $-\pi/2 < t < \pi/2, q=1-\rho$ and $A=[A_x,A_y], B=[B_x,B_y], C=[C_x,C_y]$ FIG. 3.2 helps in understanding the definition and properties of a conic. The conic of FIG. 3.2a is defined by control points A, B, C, and the conic of FIG. 3.2b A, B, C subdivides into two conics A, W, X and X, Y, C.

A conic [A,B,C] has the property that any segment of it is also a conic. In particular it can be subdivided into two conics whose control points are given by the following expressions $$[A,(qA+\rho B),q(A+C)/2+\rho B)]$$

$$[q(A+C)/2+\rho B),(qC+\rho B),C\ ]$$

with each subconic having a new shape parameter "$\rho'$" given by the following expression.

$$\rho'=1/[1+\sqrt{(2-2\rho)}]$$

3.3 Parabolas

A parabola with control points [A,B,C] is a special case of a conic with control points [A,B,C] and shape parameter $\rho=0.5$. Also a parabola's parametric equation can be greatly simplified to the form given below, $$[X(t),Y(t)]=A(1-t)^2+2Bt(1-t)+Ct^2$$

where $0<t<1$ and $A=[A_x,A_y], B=[B_x,B_y], C=[C_x,C_y]$ which can also be written as $$[X(t),Y(t)]=D_0+2D_1 t+D_2 t^2 \text{ where } 0<t<1$$

and $D_0=A, D_1=B-A, D_2=C-2B+A$

A parabola [A,B,C] has the property that any segment of it is also a parabola. In particular it can be subdivided into two parabolas whose control points are given by the following expressions.

$$[A,(A+B)/2,(A+2B+C)/4]$$

$$[(A+2B+C)/4,(B+C)/2,C\ ]$$

As can be noticed, a parabola is also a special case of a cubic spline. In fact it is a quadratic spline. In a later section we will derive how both conics and cubic splines can be approximated by a sequence of adjoining parabolas.

3.4 Circular Arcs

A circular arc with control points [A,B,C] is also a special case of a conic with the constraint that B lies on the perpendicular bisector of the side AC and has a shape parameter "$\rho$" given by the following equation.

$$\rho=m[\sqrt{(1+m^2)}]-m^2, \text{ where } m=\tan ABC/2$$

Note that a circular arc may also be specified by the points [P,Q,R] with the arc starting at P passing through Q and ending at R. Later on we will show how control points [A,B,C] along with the parameter $\rho$ can be derived from [P,Q,R].

3.5 Straight Lines

A straight line segment with control points [A,B] starts at A and ends at B and can be described by the following parametric equation.

$$[X(t),Y(t)]=A(1-t)+Bt \text{ where } 0<t<1, A=[A_x,A_y] \text{ and } B=[B_x,B_y]$$

3.6 Algorithms

The flow charts 3.3a through 3.3c give the algorithms for decomposing Cubic Splines, Circular Arcs and Conics into parabolic segments. Flow chart 3.3d gives an algorithm for decomposing Parabolas into line segments. Flow chart 3.e gives an algorithm to split parabolas into sub parabolas, if necessary, and then generate parazoids.

In FIG. 3.3a, d is the distance between adjacent pixels in the coordinate system and m is the number of parabolic segments needed to approximate the cubic spline S. In FIG. 3.3b, if R is a full circle, m= 16, Z=(A+ B)/2 and D=E= Z+ (r,0). $c_0$=cos 22.5, $c_2$= sin 22.5 and $c_3$=tan 11.25.

R is a circular arc start in at A passing through B and ending at C. Alternately, R is a circular arc centered at Z with radius r, starting angle $theta_1$ and ending angle $theta_2$. c indicates whether the traversal is clockwise or counter-clockwise. Note that Interpress uses the first scheme, while Postscript uses the second. We convert either of these representations to a third representation, where R starts at D, ends at E, with center at Z, traversing in a counter clockwise direction. m= theta/22.5 rounded up to the nearest integer, where theta is the angle subtended by R at the center.

In FIG. 3.3d, d is the distance between adjacent pixels in the coordinate system, and m is the number of linear segments needed to approximate the parabola P.

4.0 Approximations

In this section we will derive conditions under which the higher order curves introduced in the previous section can be approximated by a lower order curve to any desired level of accuracy.

4.1 Approximation of a Cubic Spline by a Parabola

A cubic spline S with control points [A,B,C,D] described by $$[S(t)]=A+3(B-A)t+3(C-2B+A)t^2+(D-3C+3B-A)t^3$$

can be replaced by a parabola P with control points [A,E,D] described by $$[P(t)]=A+2(E-A)t+(D-2E+A)t^2$$

without loss of accuracy if the following conditions hold good.

$$D-3C+3B-A=0, D-2E+A=3(C-2B+A) \text{ and } 2(E-A)=3(B-A)$$

The above three conditions can be reduced to two conditions as given below by multiplying the third equation by 3 and adding it to the second equation.

$$D-3C+3B-A=0, E=(3B+3C-A-D)/4$$

A cubic spline S with control points [A,B,C,D] can be approximated by a parabola P with control points [A,(3B+3C−A−D)/4,D] with difference d between the two curves as a function of a defined error vector "e" as follows.

$$d(t) = [S(t) - P(t)] = -(e/2)[2t^3 - 3t^2 + t]$$

$$\text{where } e = 3C - 3B - D + A$$

This difference is zero at t= 0, 0.5 and 1. It maximizes at t= 0.2113 and 0.7887 with maximum difference given by $$|d|_{max} = 0.0481 |e|$$

Note that the maximum error is a simple function of the original control points [A,B,C,D]. If the maximum error is within the tolerance limits such as the spacing between adjacent pixels, then the approximation is acceptable. To simplify the computation a stricter constraint can be imposed if we replace ∥e∥ by (∥$e_x$∥ × ∥$e_y$∥) in the above expression.

4.2 Approximation of a segment of a Cubic Spline by a Parabola

If the maximum difference as calculated above is beyond the tolerance limits, then the cubic spline can be subdivided and each segment approximated by a parabola. We now derive expressions for the maximum difference for the parabolic approximation of a segment of the spline as a function of the maximum difference for the parabolic approximation of the entire spline.

Let $S_1(t)$ denote that segment of the cubic spline S(t) for $x \leq t \leq x+\delta$.

Substituting $t=(x+u\delta)$ into S(t) and rearranging we get the following equation.

$$[S_1(u)] = X_0 + 3X_1(x+\delta u) + 3X_2(x+\delta u)^2 + X_3(x+\delta u)^3$$

for 0<u<1 where $$X_0 = A, X_1 = (B-A), X_2 = (C-2B+A), X_3 = (D-3C+3B-A)$$

Expanding and rearranging we get the following equation.

$$[S_1(u)] = Y_0 + 3Y_1 u + 3Y_2 u^2 + Y_3 u^3$$

for 0<u<1 where $$Y_0 = A + 3(B-A)x + 3(C-2B+A)x^2 + (D-3C+3B-A)x^3$$

$$Y_1 = [(B-A) + 2(C-2B+A)x + (D-3C+3B-A)x^2]\delta$$

$$Y_2 = [(C-2B+A) + (D-3C+3B-A)x]\delta^2$$

$$Y_3 = (D-3C+3B-A)\delta^3$$

As expected $S_1$ is also a cubic spline. It has control points $[A_1, B_1, C_1, D_1]$ as given below.

$$A_1 = Y_0, B_1 = Y_1 + Y_0, C_1 = (Y_2 + 2Y_1 + Y_0), D_1 = (Y_3 + 3Y_2 + 3Y_1 + Y_0)$$

As before $S_1$ can be approximated by a parabola $P_1$ with control points $[A_1, E_1, D_1]$, where $E_1 = (3B_1 + 3C_1 - A_1 - D_1)/4$. Note that $A_1 = S(x)$ and $D_1 = S(x+\delta)$.

We can substitute for $A_1, B_1, C_1$ and $D_1$ and simplify the expression for $E_1$ in terms of S, x and $\delta$ as given below.

$$E_1 = (4Y_0 + 6Y_1 - Y_3)/4$$

Simplifying further and using the notation S'(x) for the derivative of S(x), we get $$E_1 = S(x) + S'(x)\delta/2 - S'''(x)\delta^3/24.$$

Control points for $P_1$ are now given by, $$[S(x), S(x) + S'(x)\delta/2 - S'''(x)\delta^3/24, S(x+\delta)]$$

The difference $d_1$ between the curves $S_1$ and $P_1$ as a function of a defined error vector "$e_1$" is given below.

$$d_1(u) = [S_1(u) - P_1(u)] = -(e_1/2)[2u^3 - 3u^2 + u] \text{ where } e_1 = 3C_1 - 3B_1 - D_1 + A_1$$

Again, this difference is zero at u= 0, 0.5 and 1. It maximizes at u=0.2113 and 0.7887 with maximum difference given by ∥$d_1$∥$_{max}$ = 0.0481 ∥$e_1$∥.

After substitution and simplification, we get the following expressions for $d_1$ and $e_1$.

$$e_1 = e\delta^3 \text{ and } |d_1|_{max} = 0.0481 e\delta^3$$

Discussion: Note that $d_1$ is only a function of "∥∥", the "length" of the segment along the "t" axis of the original spline and not a function of "x" the starting point of the segment. Since $d_1$ is a cubic function of ∥∥, the process of approximating cubic spline segments by parabolas converges rapidly. Hence, for any desired level of accuracy, the number of segments "n" ($\geq 1/$∥) needed for approximation by parabolas can be determined apriori without going through the subdivision process. Note that there is no loss of generality by making ∥ for each segment to be the same. For computational purposes it may be advantageous to make "n" a power of two.

4.3 Approximation of a Parabola by a Straight Line

A parabola P with control points [A,E,D] described by $$[P(t)] = A + 2(E-A)t + (D-2E+A)t^2$$

can be replaced by a straight line L with control points [A,D] described by $$[L(t)] = A + (D-A)t$$

without loss of accuracy if the following conditions hold good.

$$D - 2E + A = 0 \text{ and } 2(E-A) = (D-A)$$

The above two conditions can be reduced to one condition as given below.

$$D - 2E + A = 0$$

A parabola P with control points [A,E,D] can be approximated by a straight line L with control points [A,D] with difference d between the two curves as a function of a defined error vector "e" as follows.

$$d(t) = [P(t) - L(t)] = e[t^2 - t]$$

-continued $$\text{where } e = D - 2E + A$$

This difference is zero at t=0 and 1. It maximizes at t=0.5 with maximum difference given by $$|d|_{max} = 0.25|e|$$

Note that the maximum error is a simple function of the original control points [A,E,D]. If the maximum error is within the tolerance limits such as the size of one pixel, then the approximation is acceptable. To simplify the computation a stricter constraint can be imposed if we replace $\|e\|$ by $(\|e_x\| + \|e_y\|)$ in the above expression.

4.4 Approximation of a segment of a Parabola by a Straight Line

If the maximum difference as calculated above is beyond the tolerance limits, then the parabola can be subdivided and each segment approximated by a straight line. We now derive expressions for the maximum difference for the straight line approximation of a segment of the parabola as a function of the maximum difference for the straight line approximation of the entire parabola.

Let $P_1(t)$ denote that segment of the parabola $P(t)$ for $x \leq t \leq x+\delta$.

Substituting $t=(x+u\delta)$ into $P(t)$ and rearranging we get the following equation.

$$[P_1(u)] = A_1 + 2(E_1 - A_1)u + (D_1 - 2E_1 + A_1)u^2$$

for $0 < u < 1$ where $$A_1 = A + 2(E-A)x + (D-2E+A)x^2$$

$$E_1 = A + [(E-A) + (D-2E+A)x]\delta$$

$$D_1 = 2E_1 - A_1 + (D-2E+A)\delta^2$$

As expected $P_1$ is also a parabola which can be approximated by a straight line $L_1$ with control points $[A_1, D_1]$ with the difference $d_1$ between the curves as a function of a defined error vector "e" as follows.

$$d_1(u) = [S_1(u) - P_1(u)] = e_1[u^2 - u]$$

where $e_1 = (D_1 - 2E_1 + A_1) = (D - 2E + A)\delta^2$

Again, this difference is zero at u=0 and 1. It maximizes at u= 0.5 with maximum difference given by $\|d_1\|_{max} = 0.25\|e_1\|$.

After Substitution and simplification, we get the following expressions for $d_1$ and $e_1$ $$e_1 = e\delta^2 \text{ and } |d_1|_{max} = 0.25|e|\delta^2$$

Discussion: Note that $d_1$ is only a function of "$\|$ ", the "length" of the segment along the "t" axis of the original parabola and not a function of "x" the starting point of the segment. Since $d_1$ is a quadratic function of $\|$ , the process of approximating parabolic segments by straight lines also converges rapidly, though not as fast as the process of approximating cubic spline segments by parabolas. Hence, for any desired level of accuracy, the number of segments "n" ($\geq 1/\|$ ) needed for approximation by straight lines can be determined apriori without going through the subdivision process. Note that there is no loss of generality by making $\|$ for each segment to be the same. For computational purposes it may be advantageous to make n a power of two.

4.5 Approximation of a Conic by a Parabola

A conic N with control points [A,B,C] and shape parameter $\rho$ described by $$(q+\rho \cos t)N(t) = [(A+C)/2]q - [(A-C)/2] q \sin t + \rho B \cos t$$

where $-\pi/2 < t < \pi/2$ and $q = 1 - \rho$ can be replaced by a parabola P with control points [A,B,C] described by $$(1+\cos t)P(t) = [(A+C)/2] - [(A-C)/2]\sin t + B \cos t$$

where $-\pi/2 < t < \pi/2$ or alternatively, by $$[P(u)] = A + 2(B-A)u + (C-2B+A)u^2 \text{ where } 0 < u < 1$$

without loss of accuracy if the following condition holds good $$q = \rho = 0.5$$

A conic N with control points [A,B,C] can be approximated by a parabola P with control points [A,B,C] with difference d between the two curves given by the following expression $$(2 + 2\cos t - 2\rho \sin^2 t)d(t) = (q - \rho)[(C - 2B + A) + (C - A)\sin t]\cos t$$

This difference is zero at $t = -\|/2$ and $+\|/2$. The maximum of this difference cannot be easily computed. However its value at t= 0 is close to the maximum difference and we use that value to approximate the maximum. We therefore get, $$|d|_{max} \approx |e|(1 - 2\rho)/4, \text{ where } e = C - 2B + A$$

If the maximum error is within the tolerance limits such as the size of one pixel, then the approximation is acceptable. To simplify the computation a stricter constraint can be imposed if we replace $\|e\|$ by $(\|e_x\| + \|e_y\|)$ in the above expression.

4.6 Approximation of a segment of a Conic by a Parabola

If the maximum difference as calculated above is beyond the tolerance limits, then the conic can be subdivided and each segment approximated by a parabola. We now derive expressions for the maximum difference for the parabolic approximation of a segment of the conic as a function of the maximum difference for the parabolic approximation of the entire conic.

Let $N_1(t)$ and $N_2(t)$ denote the subconics of $N(t)$ after subdivision.

As stated earlier in the section on properties of conics the control points and shape parameters "$\rho 1$" and "$\rho 2$" for $N_1$ and $N_2$ are given by the following expressions.

$[A, (qA+\rho B), q(A+C)/2+\rho B)]$ for $N_1$ $[q(A+C)/2+\rho B), (qC+\rho B), C]$ for $N_2$ $\rho \rho_1 = \rho_2 = 1/[1+\sqrt{2(1-\rho)}]$ Now $N_1$ can be approximated by a parabola $P_1$ defined by $[P_1(u)] = A_1 + 2(C_1-A_1)u + (C_1-2B_1+A_1)u^2$ for $0 < u < 1$ where $A_1 = A, B_1 = (qA+\rho B), C_1 = q(A+C)/2+\rho B$ with the maximum approximation error given by $|d_1|_{max} = |e_1|(1-2\rho_1)/4$ where $e_1 = C_1 - 2B_1 + A_1$ After substitution, we get $$|d_1|_{max} = |[\rho e + (1-2\rho)(C-A)]|(1-2\rho_1)/8$$

Similarly $N_2$ can be approximated by a parabola $P_2$ defined by $[P_2(u)] = A_2 + 2(C_2-A_2)u + (C_2-2B_2+A_2)u^2$ for $0 < u < 1$ where $A_2 = q(A+C)/2+\rho B, B_2 = (qC+\rho B), C_2 = C$ with the maximum approximation error given by $|d_2|_{max} = |e_2|(1-2\rho_2)/4$ where $e_2 = C_2 - 2B_2 + A_2$ After substitution, we get $$|d_2|_{max} = |[\rho e - (1-2\rho)(C-A)]|(1-2\rho_2)/8$$

Letting $\rho = 0.5 - \delta$ and ignoring second and higher order terms in $\delta$, we can derive the following simplified expressions.

$\rho_1 = \rho_2 \approx 0.5 - \delta/4$ $|d|_{max} = |e|\delta/2$ $|d_1|_{max} = |d_2|_{max} = |e|\delta/32 = |d|_{max}/16$ Discussion: The above expression shows that the process of subdividing a conic with the intent of approximating each segment by a parabola converges very rapidly with the approximation error decreasing approximately by a factor of 16 for each subdivision. Liu in his report uses the test of $|\rho' - 0.5| \leq \epsilon$, with $\epsilon$ presently set at 0.01, as the criterion for stopping the subdivision process. Using this test the error reduces only by a factor of 4 each time the conic is subdivided. It is possible in such a case to construct a conic where the median is sufficiently long so that the resulting error due to approximation is more than one pixel. It is also possible to construct a conic where the median is sufficiently short that unnecessary subdivisions are done just to satisfy the test. It is suggested here that a more optimum test of $|d|_{max} \leq$ spacing between adjacent pixels be used as the criterion for stopping the subdivision process.

Approximation of $\rho_1$ and $\rho P_2$

Every time a conic is subdivided a new shape parameter has to be calculated. Note that this calculation requires the use of square root and divide operators, both of which are computationally expensive. Here we give a simplified approximate formula which does not use the square root and divide operators. Only the formula is given here without the derivation.

$$\rho_1 = \rho_2 \approx 0.5 - 0.25(\delta - \delta^2 + \delta^3) \text{ where } \delta = (0.5 - \rho)$$

Table 4.1 gives the difference between the exact and approximate values of $\rho_1$ and $\rho_2$ for different values of $\rho$ when the above formula is used.

TABLE 4.1

| $\rho$ | Approximation error |
|---|---|
| 0.2 | $7.7 \times 10^{-4}$ |
| 0.25 | $2.7 \times 10^{-4}$ |
| 0.3 | $3.9 \times 10^{-5}$ |
| 0.35 | $3.0 \times 10^{-5}$ |
| 0.4 | $2.4 \times 10^{-5}$ |
| 0.45 | $5.3 \times 10^{-6}$ |
| 0.5 | 0.0 |
| 0.55 | $1.1 \times 10^{-5}$ |
| 0.6 | $1.0 \times 10^{-4}$ |
| 0.65 | $4.9 \times 10^{-4}$ |
| 0.7 | $1.7 \times 10^{-3}$ |

We now use the criterion that the use of the given simplified formula for $\rho'$ contribute no more than half a pixel error in the subdivided conic. Also we assume that the original conic is such that the median of the enclosing triangle can be as long as the diagonal of 8.5"×11" paper. With this criterion the maximum permissible error for the approximation will be $3.3 \times 10^{-4}$ at 600 spi and $6.6 \times 10^{-4}$ at 300 spi and the following rule can be stated.

For 600 spi use the simplified formula for $0.25 \leq \rho \leq 0.62$ and the exact formula otherwise.

Further at 600 spi, it can be verified that the exact formula has to be used just once for $0.0 \leq \rho < 0.25$ and for $0.62 < \rho \leq 0.8$ before the simplified formula can be used for subsequent subdivisions.

For 300 spi use the simplified formula for $0.21 \leq \rho \leq -0.66$ and the exact formula otherwise.

Further at 300 spi, it can be verified that the exact formula has to be used just once for $0.0 \leq \rho < 0.21$ and for $0.66 < \rho \leq 0.87$ before the simplified formula can be used for subsequent subdivisions.

4.7 Approximation of a Circular Arc by a parabola

A circular arc R with control points [A,B,C] and shape parameter $\rho$ described by $(q+\rho\cos t)R(t)=[(A+C)/2]q-[(A-C)/2]q\sin t+\rho B\cos t$ where $-\pi/2<t<\pi/2$ and $q=1-\rho$ can be approximated by a parabola p with control points [A,B,C] described by
or alternatively, by $[P(u)]=A+2(B-A)u+(C-2B+A)u^2$ where $0<u<1$ with difference d between the two curves given by the following expression $(2+2\cos t-2\rho\sin^2 t)d(t)=(q-\rho)[(C-2B+A)+(C-A)\sin t]\cos t$ This difference is zero at $t=-\pi/2$ and $+\pi/2$. It maximizes at $t=0$ with maximum difference given by $$|d|_{max}=|e|(1-2\rho)/4, \text{ where } e=C-2B+A$$

If the maximum error is within the tolerance limits such as the size of one pixel, then the approximation is acceptable. To simplify the computation a stricter constraint can be imposed if we replace $|e|$ by $(|e_x|+|e_y|)$ in the above expression.

Figure 4:
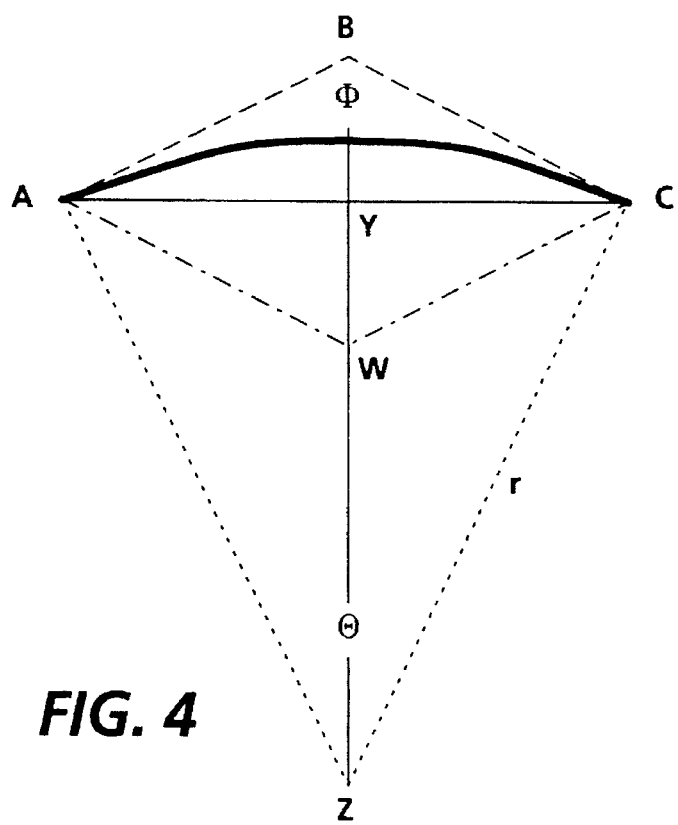
FIG. 4 illustrates the approximation of a circular arc.

In FIG. 4 let the radius of the circular arc R be "r" and the angle subtended by R at its center Z be "θ" as shown in the figure below.

The following relationships can be derived.

$|e|=|C-2B+A|=BW=2r(\sin^2\theta/2)/\cos\theta/2$
$(1-2\rho)=(1-\cos\theta/2)^2/\sin^2\theta/2$ $$|d|_{max}=(r/2)(1-\cos\theta/2)^2/\cos\theta/2$$

Table 4.2 gives the maximum error for different values of "θ" when a circle of radius "r" is approximated by a parabola. The table also gives the maximum radius of the circle if we limit the error to 1 pixel.

TABLE 4.2

| θ in degrees | maximum error due to parabolic approximation | max. radius in inches at 300 spi. for less than one pixel error | max. radius in inches at 600 spi. for less than one pixel error |
|---|---|---|---|
| 15.0 | $3.7 \times 10^{-5}$ r | 90.09 | 45.05 |
| 22.5 | $1.9 \times 10^{-4}$ r | 17.71 | 8.85 |
| 30.0 | $6.0 \times 10^{-4}$ r | 5.55 | 2.78 |
| 45.0 | $3.1 \times 10^{-3}$ r | 1.08 | 0.54 |
| 60.0 | $1.0 \times 10^{-2}$ r | 0.33 | 0.17 |

Discussion: If a circular arc is subdivided such that the subtending angle at its center is less than or equal to 15 degrees, then each sub arc can be directly replaced by a parabola and be within the acceptable error for all resolutions and radii of interest. A subtending angle of 22.5 degrees would also be an acceptable and probably a preferable choice.

5.0 Approximation of a Masked Stroke by a filled region defined by Parabolas Interpress and Postscript allow the definition of trajectories which can be thickened to draw a masked stroke on paper. The trajectory itself can be made up of lines, arcs, conics, parabolas and cubic splines. It should be noted that in general, a curve that is parallel to another curve can only be represented by a higher order mathematical equation than the original one. Most of the implementations of masked stroke to date accomplish this by decomposing all the curves into line segments and then filling a sequence of trapezoids whose center lines are the decomposed line segments. In addition to the computation involved in decomposing the curves into lines, significant amount of computation has to be done to compute the vertices of each of the trapezoids. The amount of computation needed is directly proportional to the number of line segments needed for the approximation. Jack Liu in his paper gives a method by which the inner and outer trajectories of a thickened parabola can be approximated by a sequence of parabolas themselves. Since cubic splines, circular arcs and conics can be decomposed into a small number of parabolic segments (as shown in section 3), the masked stroke can then be implemented by filling a closed trajectory of parabolas and lines. Measurements done so far by the Carina team indicate that, this is an efficient process in spite of the fact that Liu's method of computing the inner and outer trajectories by stepping an elliptical brush along the center line of a parabola requires a lot of computation. In this section we develop a mathematical theory on how we can approximate the outer and inner trajectories of the masked stroke of a parabola by parabolas themselves resulting in improved algorithms that does not require the actual stepping along the center line trajectory.

Figure 5:
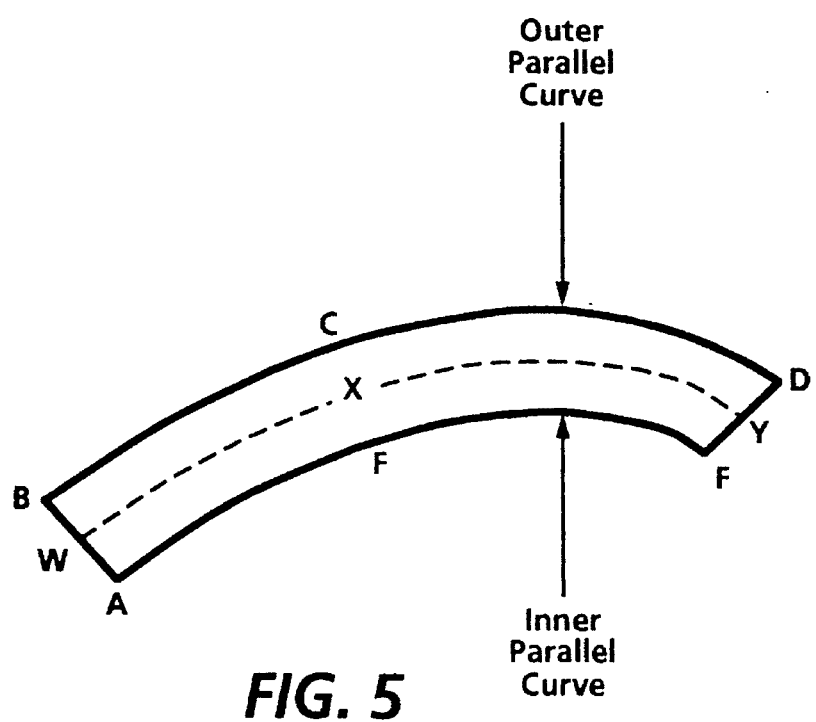
FIG. 5 shows a parabolic trajectory.

FIG. 5 shows a parabolic trajectory WXY. Trajectories BCD and EFA are curves that are parallel to WXY and the trajectory ABCDEFA defines a region which if filled will generate the masked stroke for the curve WXY. Note that BCD and EFA are not parabolas in general.

In this section, we derive easily testable conditions that the parabola WXY has to satisfy in order that BCD and EFA can be approximated by parabolas. We also derive methods of optimally sub dividing WXY so that the sub divided parabolas satisfy the required conditions when the original parabola WXY does not satisfy them.

5.1 Normalized Parabola

In order to simplify some of the mathematical equations, we define a normalized parabola and derive all the condition for the normalized parabola. Any arbitrary parabola can be reduced to the normalized parabola defined here after a sequence of transformations consisting of displacement, rotation and scaling. To maintain the generality of the results, we require that this scaling be symmetrical along the X and Y axes.

A parabola with control points [A, B, C] is a normalized parabola, if A=(0, 0), C=(0, 1) and B= $(B_x, B_y)$ with no restrictions placed on $B_x$ and $B_y$. FIG. 5.1 shows the steps involved in transforming an arbitrary parabola to a normalized parabola. Note that the shape of the parabola is not distorted after this normalization process.

A normalized parabola can therefore be completely defined by two parameters $(B_x, B_y)$ as opposed to six parameters $(A_x, A_y, B_x, B_y, C_x, C_y)$ needed for the original parabola. For the purposes of our discussion here, it is sufficient to restrict our discussion to the family of normalized parabolas. We will find that it is also convenient to define the normalized parabola by the parameters (k, θ) where k (later referred to as the skew) is the ratio of the lengths of the sides AB and AC and θ is the included angle ABC. In later discussions, we will refer to k as the skew parameter. It can be verified that $(k, \theta)$ and $(B_x, B_y)$ are related by the following equations.

$$k=(B_x^2+B_y^2)/([1-B_x^2]+B_y^2) \qquad 5.1.1$$

$$\cos\theta=(B_x^2+B_y^2-B_x)/\sqrt{(B_x^2+B_y^2)([1-B_x^2]+B_y^2)} \qquad 5.1.2.$$

$$B_x=(k^2-k\cos\theta)/(1+k^2-2k\cos\theta) \qquad 5.1.3$$

$$B_y=(\sin\theta)/(1+k^2-2k\cos\theta) \qquad 5.1.4$$

5.2 Construction of a "Parallel" Parabola

Consider a parabola P1 defined by [A, B, C] as shown in the FIG. 5.2. Consider another parabola P2 defined by [D, E, F] such that DE is parallel to AB, EF is parallel to BC and |AD|=|CF|= d for some value of d. We now give equations for computing D, E and F from knowledge of A, B, C and d.

The following equations are valid.

$$D=A+d[-\sin\theta_1,\cos\theta_1] \qquad 5.2.1.$$

$$E=B-d[(\cos\theta_1+\cos\theta_2),(\sin\theta_1+\sin\theta_2)]/\sin(\theta_1-\theta_2) \qquad 5.2.2.$$

$$F=C+d[\sin\theta_2, -\cos\theta_2] \qquad 5.2.3.$$

$$\sin\theta_1=(B_y-A_y)/|AB|, \cos\theta_1=(B_x-A_x)/|AB| \qquad 5.2.4$$

$$\sin\theta_2=(B_y-C_y)/|BC|, \cos\theta_2=(B_x-C_x)/|BC| \qquad 5.2.5$$

$$T=(C+2B+A)/4 \text{ and } U=(F+2E+D)/4 \qquad 5.2.6$$

$$U_x-T_x=d[\sin\theta_2-\sin\theta_1-2(\cos\theta_1+\cos\theta_2)/\sin(\theta_1-\theta_2)]/4 \qquad 5.2.6.$$

$$U_y-T_y=d[\cos\theta_1-\cos\theta_2-2(\sin\theta_1+\sin\theta_2)/\sin(\theta_1-\theta_2)]/4 \qquad 5.2.8$$

$$|UT|=(d/2)([\sin\theta/2]+1/[\sin\theta/2]) \qquad 5.2.9$$

We next attempt to determine the deviation of P2 from a curve that is parallel to P1 and distance "d" from it. By construction, this deviation is zero at the end points D and F. Before going into detailed calculations, we consider some special cases, to get an intuitive feel for the solution. Consider the case when the parabola P1 is symmetric along its bisector BX. For this case |AB|=|AC| and difference between |TU| and "d" gives an estimate of the error when the parallel curve is approximated by P2. For this special case, this difference is in fact equal to the maximum error. As can be seen the difference gets smaller and becomes zero as $\theta$ approaches 180 degrees. In this limiting case the parabola degenerates to a straight line and hence the approximation is exact. As expected the error becomes infinitely large when the included angle $\theta$ approaches zero.

For the case when $\theta$ approaches 180 degrees, the terms in equation 5.2.2 approach the limit 0/0 leading to computational errors. The following alternate formula for computing E is recommended for the limiting case.

$$E=B+d[(-\sin\theta_1+\cos\theta_1\cot\theta/2),(\cos\theta_1+\sin\theta_1\cot\theta/2)] \qquad 5.2.10$$

5.3 Error calculation for the approximated Parallel Parabola

In section 5.2 we derived a formula which for the special case considered gives precisely the maximum error when a curve that is parallel to a parabola is approximated by another suitably chosen parabola. Such a closed form solution for estimating the error is not possible for an arbitrary parabola. We therefore pursue a numerical approach in this section to get an error estimate for the general case. We narrow down this search process by restricting our attention to the class of normalized parabolas since it is sufficient to do so.

Table 5.3.1 lists the maximum percentage error observed as a result of a numerical search procedure when the parallel curve is approximated by a parabola that is parallel to the original parabola at the end points. This process is repeated for different members in the class of normalized parabolas. For each parabola in the class, the distance between the outer parallel parabola and the original parabola was computed at different points along the original parabola as "t" was stepped from 0.0 to 1.0 in steps of 0.01. The maximum error observed as a percentage of d, the desired separation between the two curves, is listed in the table below. By construction this error is always zero at t=0.0 and t= 1.0. Table 5.3.2 lists the results obtained for the inner parallel parabola.

TABLE 5.3.1

| | k = 1 | k = 2 | k = 4 | k = 8 | k = 16 | k = 32 | k = 64 |
|---|---|---|---|---|---|---|---|
| θ = 90 | 6.07 | 2.36 | 10.40 | 25.33 | 40.41 | 53.40 | — |
| θ = 100 | 3.57 | 0.85 | 8.77 | 20.45 | 32.52 | 43.17 | 51.60 |
| θ = 110 | 2.00 | 0.69 | 7.08 | 15.95 | 25.28 | 33.72 | 40.56 |
| θ = 120 | 1.04 | 0.77 | 5.43 | 11.90 | 18.83 | 25.21 | 30.48 |
| θ = 130 | 0.48 | 0.71 | 3.91 | 8.38 | 13.23 | 17.78 | 21.61 |
| θ = 140 | 0.19 | 0.55 | 2.57 | 5.42 | 8.55 | 11.53 | 14.07 |
| θ = 150 | 0.06 | 0.35 | 1.48 | 3.08 | 4.85 | 6.55 | 8.03 |
| θ = 160 | 0.01 | 0.17 | 0.67 | 1.38 | 2.17 | 2.94 | 3.62 |
| θ = 170 | 0.00 | 0.04 | 0.17 | 0.35 | 0.55 | 0.74 | |

Maximum Percentage error observed when outer parallel curve is approximated by another parabola

TABLE 5.3.2

| | k = 1 | k = 2 | k = 4 | k = 8 | k = 16 | k = 32 | k = 64 |
|---|---|---|---|---|---|---|---|
| θ = 90 | 6.07 | 2.26 | 11.02 | 26.98 | 43.72 | — | — |
| θ = 100 | 3.57 | 0.79 | 9.19 | 21.56 | 34.77 | 56.45 | — |
| θ = 110 | 2.00 | 0.74 | 7.35 | 16.67 | 26.76 | 36.36 | — |
| θ = 120 | 1.04 | 0.80 | 5.60 | 12.35 | 19.74 | 26.86 | — |
| θ = 130 | 0.48 | 0.73 | 4.00 | 8.63 | 13.75 | 24.60 | — |
| θ = 140 | 0.19 | 0.56 | 2.62 | 5.55 | 8.82 | 12.01 | 69.71 |
| θ = 150 | 0.06 | 0.35 | 1.50 | 3.13 | 4.96 | 6.76 | 9.75 |
| θ = 160 | 0.01 | 0.17 | 0.67 | 1.39 | 2.20 | 3.00 | 3.72 |
| θ = 170 | 0.00 | 0.04 | 0.17 | 0.35 | 0.55 | 0.75 | |

Maximum Percentage error observed when inner parallel curve is approximated by another parabola Table 5.3.3 presents the data of Table 5.3.2 and Table 5.3.1 in a different way. It lists the maximum tolerable skew (k) for either of the parallel curves as function of $\theta$ (the included angle) and the maximum acceptable error limit. FIG. 5.3.1 depicts the same data in a graphical form on a logarithmic scale.

TABLE 5.3.3

| | error limit = 1% | error limit = 2% | error limit = 4% | error limit = 8% | error limit = 16% |
|---|---|---|---|---|---|
| θ = 90 | k = 1.000 | k = 1.000 | k = 1.000 | k ≤ 3.438 | k ≤ 5.000 |
| θ = 100 | k = 1.000 | k = 1.000 | k ≤ 2.797 | k ≤ 3.719 | k ≤ 5.938 |
| θ = 110 | k = 1.000 | k ≤ 2.375 | k ≤ 2.969 | k ≤ 4.219 | k ≤ 7.625 |
| θ = 120 | k = 1.000 | k ≤ 2.484 | k ≤ 3.281 | k ≤ 5.188 | k ≤ 11.25 |
| θ = 130 | k ≤ 2.156 | k ≤ 2.750 | k ≤ 3.984 | k ≤ 7.250 | k ≤ 22.00 |
| θ = 140 | k ≤ 2.406 | k ≤ 3.375 | k ≤ 5.625 | k ≤ 13.50 | k ≤ 63.83 |
| θ = 150 | k ≤ 3.094 | k ≤ 5.000 | k ≤ 1.00 | k ≤ 49.88 | k ≤ 256.0* |
| θ = 160 | k ≤ 5.625 | k ≤ 13.50 | k ≤ 88. | k ≤ 256.0* | k ≤ 256.0* |
| θ = 170 | k ≤ 88.00 | k ≤ 256.0* | k ≤ 256.0* | k ≤ 256.0* | k ≤ 256.0* |

*Maximum acceptible skew when either of the parallel curves is approximated by a parabola As can be seen from FIG. 5.3.1, we can tolerate reasonably large values of skew when θ is in the range (120, 150), much larger values of skew when θ is in the range (150, 170) and there are no practical limits on the skew when θ is in the range (170, 180). In the next section we derive some results which show how an arbitrary parabola with included angle θ, can always be sub divided such that each of the component parabolas have an included angle of (90+θ/2). As this process is continued, we rapidly reach a state where each of the component parabolas have values (k, θ) such that the maximum error, when the parallel curves are approximated by parabolas, is within a desired error limit. Table 5.3.4 shows the included angle for each of the component parabolas, after the original parabola has been sub divided into n components.

TABLE 5.3.4

| Included angle for the original Parabola | Included angle after sub dividing into two parabolas | Included angle after sub dividing into four parabolas | Included angle after sub dividing into eight parabolas |
|---|---|---|---|
| 90 | 135 | 157.5 | 168.75 |
| 100 | 140 | 160.0 | 170.00 |
| 110 | 145 | 162.5 | 171.25 |
| 120 | 150 | 165.0 | 172.50 |
| 130 | 155 | 167.5 | 173.75 |

5.4 Sub division of Parabolas

In this section we show how an arbitrary parabola can be sub divided such that each of the component parabolas have an included angle that is larger than the original included angle. In fact, if θ is the included angle for the original parabola, the sub division procedure derived here always yields an included angle of (90+θ/2) for both the component parabolas. This sub division when continued, converges very rapidly such that the included angle and the skew of each of the component parabolas are within the limits for any desired level of approximation.

Let P= [A,B,C] define a parabola as shown in FIG. 5.4. Let P1 and P2 be two segments of P obtained by sub dividing P at t=u. Let P1=[A,D,E] and P2=[E,F,C].

Let θ, $\theta_1$ and $\theta_2$ be the included angles for P, P1 and P2 respectively. Let k, k1 and k2 be the skews for P, P1 and P2 respectively. We now have the following equations.

$$k+l_1/l_2 \text{ where } l_1=|AB| \text{ and } l_2=|AC| \quad 5.4.1$$

$$k_1=l_3/l_4 \text{ where } l_3=|AD| \text{ and } l_4=|DE| \quad 5.4.2$$

$$k_2=l_5/l_6 \text{ where } l_5=|EF| \text{ and } l_6=|FC| \quad 5.4.3$$

$$(180-\theta_1)+(180-\theta_2)=180-\theta \quad 5.4.4$$

$$\text{if } \theta_1\theta_2 \text{ then } \theta_1=\theta_2=\pi+\theta/2 \quad 5.4.5$$

$$\text{if } \theta<180 \text{ then } 90+\theta/2>\theta \quad 5.4.6$$

From vector algebra, if $V_1=(V_{1x},V_{1y})$ and $V_2=(V_{2x},V_{2y})$ are two vectors then the angle φ between these two vectors is given by the following equation.

$$\cos \phi=(V_{1x}V_{2x}+V_{1y}V_{2y})/(|V_1||V_2|) \quad 5.4.7$$

Using the results of section 3.4, we can write the following expressions for D, E and F.

$$D=A+(B-A)u, E=A+2(B-A)u+(C-2B+A)u^2 \text{ and } F=C+(B-C)(1-u) \quad 4.8$$

Since θ is the angle between vectors BA and BC, $\theta_1$ is the angle between vectors DA and DF and $\theta_2$ is the angle between vectors FD and FC, we can write the following expressions.

$$\cos \theta=[(A_x-B_x)(C_x-B_x)+(A_y-B_y)(C_y-B_y)]/l_1 l_2 \quad 5.4.9$$

$$\cos \theta_1=[(A_x-D_x)(F_{x-Dx})+(A_y-D_y)(F_y-D_y)]/[|DA||DF|] \quad 5.4.10$$

$$\cos \theta_2=[(D_x-F_x)(C_x-F_x)+(D_y-F_y)(C_y-F_y)]/[|DF||FC|] \quad 5.4.11$$

It can be verified that the following equations are valid.

$$|DA|=ul_1 \text{ and } |FC|=(1-u)l_2 \quad 5.4.12$$

$$A-D=(A-B)u \quad 5.4.13$$

$$F-D=(C-B)u+(B-A)(1-u) \quad 5.4.14$$

$$C-F=(C-B)(1-u) \quad 5.4.15$$

$$\cos \theta_1=[-l_1^2 u(1-u)+l_1 l_2 u^2 \cos \theta]/ul_1|DF| \quad 5.4.16$$

$$\cos \theta_2=[-l_2^2 u(1-u)+l_1 l_2(1-u)^2 \cos \theta]/(1-u)l_2|DF| \quad 5.4.17$$

If we set $\theta_1=\theta_2$ and hence $\cos \theta_1 = \cos \theta_2$ and simplify, we finally get the following simple solution for "u", the point at which a parabola has to be split so that both of the component parabolas have a higher included angle. note that u is only a function of k.

$$\boxed{u = l_1/(l_1 + l_2) \text{ or } u = k/(k + 1)} \quad 5.4.18$$

We now derive some useful properties about the component parabolas, in terms of the properties of the original parabola so that the component parabolas can be tested easily to determine if they satisfy the requirements for approximation. Specifically we derive expressions for cos $\theta_1$, cos $\theta_2$, $k_1$ and $k_2$ in terms of cos θ and k.

We first compute |DE| and |EF| before deriving expressions for $k_1$ and $k_2$.

$$|DE|^2=(D_x-E_x)^2+(D_y-E_y)^2 \quad 5.4.19$$

$$|DE|^2=[(B_x-A_x)(u-u^2)+(C_x-B_x)u^2]^2+[(B_y-A_y)(u-u^2)+(C_y-B_y)u^2]^2 \quad 5.4.20$$

$$|DE|^2=[u^2(1-u)^2l_1^2+u^4l_2^2+2u^3(1-u)[(B_x-A_x)(C_x-B_x)+(B_yA_y)(C_y-B_y)]] \quad 5.4.21$$

$$|DE|^2=[u^2(1-u)^2l_1^2+u^4l_2^2-2u^3(1-u)l_1l_2\cos\theta] \quad 5.4.22$$

Substituting $k/(k+1)$ for $u$, we get the following $$|DE|^2 = [k^2l_1^2 + k^4l_2^2 - 2k^3l_1l_2\cos\theta]/(1+k)^4 \quad 5.4.23$$
$$|DE| = [kl_1\sqrt{(2-2\cos\theta)}]/(1+k)^2 \quad 5.4.24$$
$$k_1 = |AD/DE| = [k/(k+1)]l_1(1+k)^2/[kl_1\sqrt{(2-2\cos\theta)}] \quad 5.4.25$$

$$\boxed{k_1 = (1+k)/\sqrt{[2(1-\cos\theta)]}} \quad 5.4.26$$

Similarly, we can derive the following expressions for $|EF|$ and $k_2$.

$$|EF| = [kl_2\sqrt{(2-2\cos\theta)}]/(1+k)^2 \quad 5.4.27$$

$$\boxed{k_2 = (k\sqrt{[2(1-\cos\theta)]})/(1+k)} \quad 5.4.28$$

Since $\theta_1=\theta_2=(90+\theta/2)$, we have the following equation.

$$\boxed{\cos\theta_1 = \cos\theta_2 = -\sqrt{[(1-\cos\theta)/2]}} \quad 5.4.29$$

5.5 Empirically Derived Test Criterion

In section 5.4, we developed a theory regarding how a parabola should be sub divided in order that the curves that are parallel to it can be approximated by parabolas themselves. We also derived results that enable us to calculate fairly easily the properties of the component parabolas in terms of the properties of the original parabola. In section 5.2, we tabulated the maximum errors that will be observed by the use of the approximation process mentioned. In this section, we provide a simple but empirically derived criterion that can be used to test whether a parabola should be further sub divided or not. We also tabulate the maximum error that will be observed, if this test criterion is used. It should be noted that the theory developed here can still be used to choose an entirely different test criterion, based upon a different set of assumptions regarding maximum tolerable error and the acceptable complexity of the test criterion itself. In fact, one may even chose different test criteria for different cases. The test criterion given here was chosen based upon three desirable qualities as listed below:

1. It is simple to test.
2. It can be used over a wide range of curves.
3. The maximum error introduced in the line width is acceptable.

If $\theta$ and $k$ are the included angle and skew respectively for a given parabola as defined earlier, then the following test can be used to determine whether the parabola should be sub divided. Any time a parabola is sub divided it is done at the point given by the equation 5.4.14.

The following test gives the allowed range for $k$ as a function of the cosine of the included angle when the maximum error limit for the stroke width is set 1.25% of the desired width.

$-0.391>\cos\theta>-0.843: 1/(-0.11-3.61\cos\theta))<k<(-0.11-3.61\cos\theta)$ $-0.843>\cos\theta>-0.940: 1/(-21.00-28.25\cos\theta))<k<(-21.00-28.25\cos\theta))$ $-0.940>\cos\theta>-0.980: 1/(-334.76-362.00\cos\theta))<k<(-334.76-362.00\cos\theta))$ $-0.980>\cos\theta>-1.000: 0<k<\infty$ The following test gives the allowed range for $k$ as a function of the cosine of the included angle when the maximum error limit for the stroke width is set 2.50% of the desired width.

$-0.340>\cos\theta>-0.891: 1/(-1.19-6.75\cos\theta)<k<(-1.19-6.75\cos\theta)$ $-0.891>\cos\theta>-0.965: 1/(-160.50-187.50\cos\theta)<k<(-160.50-187.50\cos\theta)$ $-0.965>\cos\theta>-1.000: 0<k<\infty$ The following test gives the allowed range for $k$ as a function of the cosine of the included angle when the maximum error limit for the stroke width is set 5.00% of the desired width.

$-0.010>\cos\theta>-0.710: 1/(1.70-4.20\cos\theta)<k<(1.70-4.20\cos\theta))$ $-0.710>\cos\theta>-0.874: 1/(-21.50-37.00\cos\theta)<k=(-21.50-37.00\cos\theta)$ $-0.874>\cos\theta>-0.950: 1/(-880.00-1020.00\cos\theta))<k<(-880.00-1020.00\cos\theta)$ $-0.950>\cos\theta>-1.000: <k<\infty$ Note that cosine of the included angle in the conditions given above can be calculated directly from a knowledge of the control points using equation 5.4.9 without using the trigonometric operations. Computing this way requires the use of one division, one square root and several addition and multiplication operations. If the parabola in question was obtained by sub dividing another parabola, then the cosine of new included angle for this parabola can be calculated more easily using equation 5.4.29 from a knowledge of the cosine of the included angle for the parent parabola. FIGS. 5.5.1 a through f show a plot of the actual maximum error as a function of the included angle, if the limit for k is chosen according to the equations given above. The three plots correspond to the three cases where the designed maximum error limit was chosen to be 1.25%, 2.5% and 5.0% respectively. The figures also show a plot of k as a function of included angle.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

I claim:

1. A method for displaying a computer generated image described in page description language on a raster output scanner comprising the steps of:

generating a trajectory from said page description language which trajectory is described in page description language approximating a part of said trajectory by an original parabola having control points A, B and C which original parabola approximates said part of said trajectory, to within a predetermined error limit, generating for said original parabola a set of approximating parabolas which approximating parabolas together constitute two curved lines that are parallel to, and a predetermined distance away from, said original parabola, said generating step comprising:

a. determining a number of segments that the original parabola must be divided into in order that an approximating parabola can be generated for each segment, b. dividing said original parabola into said segments, and c. generating an approximating parabola for each of said segments, converting said set of approximating parabolas into a bit map, and sending said bit map to a raster output scanner, wherein said determining step comprises a. testing said original parabola having control points A, B, C by dividing distance AB by distance BC if distance AB is longer or distance BC by distance AB if distance BC is longer, to generate a result K and comparing the result K to a limit which is a function of included angle ABC, b. if the result is less than the limit, the parabola does not need to be subdivided, c. if the result is greater than the limit, the parabola is subdivided, and this method returns to step a. for each resultant segment.

2. A method for displaying a computer generated image described in page description language on a raster output scanner comprising the steps of:

generating a trajectory from said page description language which trajectory is described in page description language approximating a part of said trajectory by an original parabola having control points A, B and C which original parabola approximates said part of said trajectory, to within a predetermined error limit, generating for said original parabola a set of approximating parabolas which approximating parabolas together constitute two curved lines that are parallel to, and a predetermined distance away from, said original parabola, said generating step comprising:

a. determining a number of segments that the original parabola must be divided into in order that an approximating parabola can be generated for each segment, b. dividing said original parabola into said segments, and c. generating an approximating parabola for each of said segments, converting said set of approximating parabolas into a bit map, and sending said bit map to a raster output scanner, wherein said generating step for each approximating parabola A, B, C comprises determining lines $A_1B_1$ and $B_1C_1$ which are parallel to AB and BC, respectively, and using control points $A_1B_1C_1$ to generate said approximating parabola.

* * * * *